United States Patent
Han et al.

(10) Patent No.: US 12,340,318 B2
(45) Date of Patent: Jun. 24, 2025

(54) DEVICE FOR PROCESSING TIME SERIES DATA HAVING IRREGULAR TIME INTERVAL AND OPERATING METHOD THEREOF

(71) Applicant: ELECTRONICS AND TELECOMMUNICATIONS RESEARCH INSTITUTE, Daejeon (KR)

(72) Inventors: Youngwoong Han, Daejeon (KR); Hwin Dol Park, Daejeon (KR); Jae Hun Choi, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1108 days.

(21) Appl. No.: 17/229,606

(22) Filed: Apr. 13, 2021

(65) Prior Publication Data

US 2021/0319341 A1     Oct. 14, 2021

(30) Foreign Application Priority Data

Apr. 13, 2020  (KR) ........................ 10-2020-0044642

(51) Int. Cl.
    *G06N 5/04*      (2023.01)
    *G06N 20/00*     (2019.01)
(52) U.S. Cl.
    CPC ............... *G06N 5/04* (2013.01); *G06N 20/00* (2019.01)
(58) Field of Classification Search
    None
    See application file for complete search history.

(56) References Cited

U.S. PATENT DOCUMENTS 10,169,656 B2   1/2019  Song et al.
2017/0103174 A1  4/2017  Kim et al.
(Continued)

FOREIGN PATENT DOCUMENTS

KR   20170023770 A   3/2017
KR   20170078256 A   7/2017
(Continued)

OTHER PUBLICATIONS

Montero-Manso, et al., FFORMA: Feature-Based Forecast Model Averaging, International Journal of Forecasting, vol. 36, Issue 1, Jan.-Mar. 2020, pp. 86-92 (Year: 2020).*

(Continued)

*Primary Examiner* — Wilbert L Starks

(57) ABSTRACT

Disclosed is a time-series data processing device that includes a preprocessor, a learner, and a predictor. The preprocessor generates time-series interval data based on a time interval of time-series data, generates feature interval data based on a time interval of each of features of the time-series data, and preprocesses the time-series data. The learner generates a weight group of a prediction model for generating a prediction result based on the time-series interval data, the feature interval data, and the preprocessed time-series data. The predictor generates a time-series weight, which depends on a feature weight of each of the features and a time flow of the time-series data, based on the time-series interval data, the feature interval data, and the preprocessed time-series data and generates a prediction result based on the feature weight and the time-series weight.

16 Claims, 12 Drawing Sheets

(56) References Cited

U.S. PATENT DOCUMENTS

| | | |
|---|---|---|
| 2017/0147777 A1 | 5/2017 | Kim et al. |
| 2017/0206464 A1 | 7/2017 | Clayton et al. |
| 2019/0180882 A1 | 6/2019 | Han et al. |

FOREIGN PATENT DOCUMENTS

| | | |
|---|---|---|
| KR | 20190013038 A | 2/2019 |
| KR | 20190070232 A | 6/2019 |
| KR | 20190086345 A | 7/2019 |
| KR | 20200003407 A | 1/2020 |

OTHER PUBLICATIONS

Kilimci, et al., An Improved Demand Forecasting Model Using Deep Learning Approach and Proposed Decision Integration Strategy for Supply Chain, Complexity, vol. 2019, Article ID 9067367, Mar. 26, 2019, pp. 1-16 (Year: 2019).*

Linzie, Financial Analysis with Artificial Neural Networks: Short-term Stock Market Forecasting, Honors Thesis, Gardner-Webb University, Undergraduate Honors Theses, 6, pp. 1-80, Apr. 18, 2017 (Year: 2017).*

Son, et al., Partial Convolutional LSTM for Spatiotemporal Prediction of Incomplete Data, IEEE Access, vol. 8, pp. 164762-164774, Sep. 8, 2020 (Year: 2020).*

Montero-Manso, et al., FFORMA: Feature-Based Forecast Model Averaging, International Journal of Forecasting, vol. 36, Issue 1, pp. 86-92, Mar. 2020 (Year: 2020).*

Kilimci, et al., An Improved Demand Forecasting Model Using Deep Learning Approach and Proposed Decision Integration Strategy for Supply Chain, Complexity, vol. 2019, Article ID 9067367, pp. 1-16, Mar. 26, 2019 (Year: 2019).*

* cited by examiner

DEVICE FOR PROCESSING TIME SERIES DATA HAVING IRREGULAR TIME INTERVAL AND OPERATING METHOD THEREOF

CROSS-REFERENCE TO RELATED APPLICATIONS

This application claims priority under 35 U.S.C. § 119 to Korean Patent Application No. 10-2020-0044642 filed on Apr. 13, 2020, in the Korean Intellectual Property Office, the disclosures of which are incorporated by reference herein in their entireties.

BACKGROUND

Embodiments of the present disclosure described herein relate to processing of time-series data, and more particularly, relate to a device for processing time-series data having an irregular time interval, which uses or learns a prediction model, and an operating method thereof.

Development of various technologies as well as a medical technology is improving human living standards and is extending human lifespan. However, changes in lifestyle and wrong eating habits according to the development of technologies may cause various diseases, and the like. There is a need to predict a future health condition beyond curing the current disease to lead a healthy life. Accordingly, a method of predicting a health condition in the future is being proposed by analyzing a trend of time-series medical data over time.

The development of industrial technology and information and communication technology made it possible to generate a considerable amount of information and data. Nowadays, technologies such as artificial intelligence that provides various services by learning an electronic device such as a computer using a lot of information and data are emerging. In particular, to predict a future health condition, a method of building a prediction model using various pieces of time-series medical data has been proposed. For example, the time-series medical data differs from data collected in other fields in that the time-series medical data has an irregular time interval, existence of a missing value, and a complex and unspecified feature. Accordingly, to predict the future health condition, there is a demand for effectively processing and analyzing the time-series medical data.

SUMMARY

Embodiments of the present disclosure provide a time-series data processing device that improves the accuracy and reliability of a prediction result by correcting an irregular time interval and a missing value of time-series data, and an operating method thereof.

According to an embodiment, a time-series data processing device includes a preprocessor and a learner. The preprocessor generates time-series interval data based on a time interval of time-series data, generates feature interval data based on a time interval of each of features of the time-series data, and preprocesses the time-series data. The learner generates a weight group of a prediction model for generating a prediction result based on the time-series interval data, the feature interval data, and the preprocessed time-series data.

For example, the time-series data may include the features corresponding to each of a plurality of times. The preprocessor may generate the time-series interval data corresponding to a first time based on a difference between the first time and a second time preceding the first time among the plurality of times, and may generate the feature interval data corresponding to a target feature of the first time based on a time interval between the target feature corresponding to the first time and the target feature corresponding to a time preceding the first time.

For example, when the target feature corresponding to the second time is a missing value and the target feature corresponding to a third time preceding the second time is present, the preprocessor may generate the feature interval data corresponding to the target feature of the first time based on a difference between the first time and the third time. For example, the preprocessor may generates the feature interval data corresponding to the target feature of the second time based on a difference between the second time and the third time. For example, each of the time-series interval data and the feature interval data corresponding to an initial time among a plurality of times of the time-series data may have an initial value.

For example, the preprocessor may preprocess the time-series data by putting an interpolation value into a missing value of the time-series data and may further generate masking data for distinguishing the missing value. The learner may generate the weight group further based on the masking data.

For example, the learner may include a feature learner calculating a feature weight of each of the features based on a first parameter group of the weight group, the feature interval data, and the preprocessed time-series data and generating a first learning result of the preprocessed time-series data based on the calculated feature weight, a time-series learner calculating a time-series weight of each of times of the time-series data based on a second parameter group of the weight group, the time-series interval data, and the first learning result and generating a second learning result of the preprocessed time-series data based on the time-series weight, and a weight controller adjusting the first parameter group or the second parameter group based on the first learning result or the second learning result.

For example, the feature learner may include a feature irregularity processor generating encoding data corresponding to each of the features by encoding the preprocessed time-series data and the feature interval data, a feature weight calculator calculating the feature weight by assigning the first parameter group to the encoding data, a feature weight applicator generating a feature application result by applying the encoding data or an intermediate result of the feature weight calculator to the calculated feature weight, and a missing value processor generating the first learning result by processing the feature application result based on a missing value of the time-series data.

For example, the feature learner may generate merged data corresponding to each of the features by classifying the preprocessed time-series data and the feature interval data based on the features, may generate encoding data by encoding the merged data, and may calculate the feature weight by assigning the first parameter group to the encoding data.

For example, the feature learner may generate merged data by merging the preprocessed time-series data and the feature interval data, may generate encoding data corresponding to each of the features by encoding the merged data, and may calculate the feature weight by assigning the first parameter group to the encoding data.

For example, the time-series learner may include a time-series irregularity processor encoding the time-series interval data, a time-series weight calculator calculating the time-series weight by assigning the second parameter group to the encoded time-series interval data and the first learning result, and a time-series weight applicator generating the second learning result by applying the first learning result or an intermediate result of the time-series weight calculator to the calculated time-series weight.

According to an embodiment, a time-series data processing device includes a preprocessor and a predictor. The preprocessor generates time-series interval data based on a time interval of time-series data, generates feature interval data based on a time interval of each of features of the time-series data, and preprocesses the time-series data. The predictor generates a time-series weight, which depends on a feature weight of each of the features and a time flow of the time-series data, based on the time-series interval data, the feature interval data, and the preprocessed time-series data and generates a prediction result based on the feature weight and the time-series weight.

For example, the predictor may include a feature predictor generating a first result of the preprocessed time-series data based on the feature weight, a time-series predictor generating a second result of the preprocessed time-series data based on the time-series weight, and a result generator calculating the prediction result corresponding to a target time based on the second result.

For example, the preprocessor may preprocess the time-series data by putting an interpolation value into a missing value of the time-series data and may further generate masking data for distinguishing the missing value. The feature predictor may include a feature irregularity processor generating encoding data by encoding the feature interval data and the preprocessed time-series data, a feature weight calculator generating the feature weight by applying a prediction model to the encoding data, a feature weight applicator generating a feature application result by applying the encoding data or an intermediate result of the prediction model to the feature weight, and a missing value processor generating the first result by applying the masking data to the feature application result.

For example, the time-series predictor may include a time-series irregularity processor encoding the time-series interval data, a time-series weight calculator generating the time-series weight by applying a prediction model to the encoded time-series interval data and the first result, and a time-series weight applicator generating the second result by applying the first result or an intermediate result of the prediction model to the time-series weight.

For example, the predictor may include a feature analyzer generating the feature weight based on the feature interval data and the preprocessed time-series data, a time-series analyzer generating the time-series weight based on the time-series interval data and the preprocessed time-series data, and an integrated weight applicator generating the prediction result by applying the preprocessed time-series data to the feature weight and the time-series weight.

For example, when a value for a target feature is present at a first time among a plurality of times of the time-series data and the target feature is a missing value at a second time preceding the first time, the time-series interval data corresponding to the first time is different from the feature interval data corresponding to the target feature of the first time.

According to an embodiment, an operating method of a time-series data processing device includes generating interpolation data by putting an interpolation value into a missing value of time-series data, generating time-series interval data based on a time interval of the time-series data, generating feature interval data based on a time interval of each of features of the time-series data, generating masking data based on the missing value, generating a feature weight of each of the features based on the interpolation data and the feature interval data, generating a first result based on the feature weight and the masking data, generating a time-series weight, which depends on a time flow of the time-series data, based on the first result and the time-series interval data, and generating a second result based on the time-series weight.

For example, the method may further include adjusting a parameter for generating the feature weight or the time-series weight based on the second result. For example, the method may further include calculating a prediction result corresponding to a target time based on the second result.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
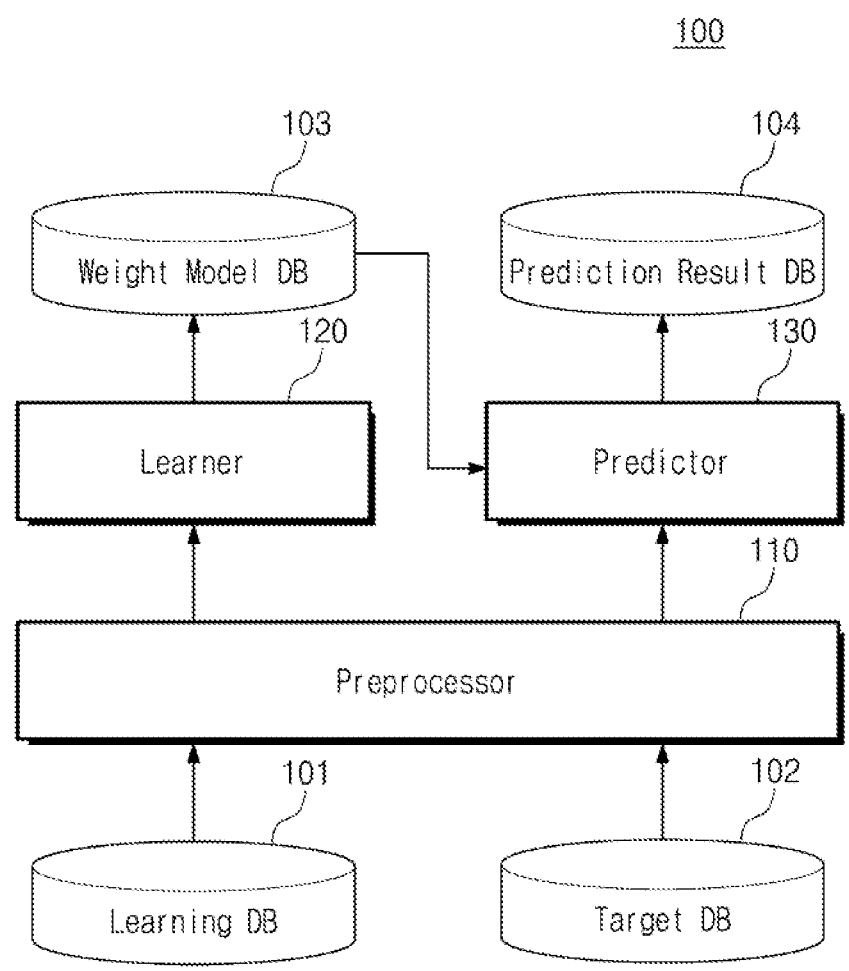
FIG. 1 is a block diagram of a time-series data processing device according to an embodiment of the present disclosure.

FIG. 1 is a block diagram of a time-series data processing device according to an embodiment of the present disclosure. It may be understood that a time-series data processing device 100 of FIG. 1 is a configuration that preprocesses time-series data and analyzes the preprocessed time-series data to learn a prediction model or to generate a prediction result. Referring to FIG. 1, the time-series data processing device 100 includes a preprocessor 110, a learner 120, and a predictor 130.

The preprocessor 110, the learner 120, and the predictor 130 may be implemented in hardware, firmware, software, or the combination thereof. For example, the software (or firmware) may be executed by a processor (not illustrated) after being loaded onto a memory (not illustrated) included in the time-series data processing device 100. For example, the preprocessor 110, the learner 120, and the predictor 130 may be implemented with hardware such as dedicated logic circuits such as Field Programmable Gate Array (FPGA) or Application Specific Integrated Circuit (ASIC).

The preprocessor 110 may preprocess the time-series data. The time-series data may be a set of data, which is recorded as time goes on and has a temporal order. The time-series data may include at least one feature corresponding to each of a plurality of times arranged in a time-series manner. For example, the time-series data may include time-series medical data indicating the health condition of a user generated by diagnosis, treatment, prescription, or the like in medical institutions, such as an electronic medical record (EMR). For clarity of description, the time-series medical data is described, but the type of the time-series data is not limited thereto. The time-series data may be generated in various fields such as entertainment, retail, smart management, and the like.

The preprocessor 110 may preprocess the time-series data so as to correct time-series irregularity of time-series data, a missing value of time-series data, and a type difference between features of time-series data. The time-series irregularity means that a time interval between a plurality of times does not have regularity. The missing value means a feature, which is missing at a specific time or is not present at a specific time, from among a plurality of features. The type difference between features means that the criteria of generating a value are different from one another for each feature. The preprocessor 110 may preprocess time-series data so as to reflect time-series irregularity to time-series data, to interpolate a missing value, to reflect the time-series irregularity of each of the features according to the missing value to the time-series data, and to match types between features with one another. This will be more fully described later.

The learner 120 may learn a prediction model based on the preprocessed time-series data. The prediction model may include a time-series analysis model for calculating a future prediction result by analyzing the preprocessed time-series data. For example, the prediction model may be built through an artificial neural network or deep learning machine learning. To this end, the time-series data processing device 100 may receive time-series data for learning from a learning database 101. The learning database 101 may be implemented in a server or a storage medium that is outside or inside the time-series data processing device 100. In the learning database 101, data may be managed, grouped, and stored in a time-series manner. The preprocessor 110 may preprocess the time-series data received from the learning database 101 and may provide the preprocessed time-series data to the learner 120.

The learner 120 may generate a weight group of the prediction model by analyzing the preprocessed time-series data. The learner 120 may generate a prediction result by analyzing the time-series data and may adjust the weight group of the prediction model such that the generated prediction result has an expected value. The weight group may be a set of all parameters included in a neural network structure or the neural network of the prediction model. The weight group and the prediction model may be stored in a weight model database 103. The weight model database 103 may be implemented in a server or a storage medium that is outside or inside the time-series data processing device 100. The weight group and the prediction model may be managed and stored in the weight model database 103.

The predictor 130 may generate a prediction result by analyzing the preprocessed time-series data. The prediction result may be a result corresponding to a specific time point in the future, that is, a prediction time. To the end, the time-series data processing device 100 may receive the time-series data for prediction from a target database 102. The target database 102 may be implemented in a server or a storage medium that is outside or inside the time-series data processing device 100. In the target database 102, data may be managed, grouped, and stored in a time-series manner. The preprocessor 110 may preprocess the time-series data received from the target database 102 and may provide the preprocessed time-series data to the predictor 130.

The predictor 130 may analyze the preprocessed time-series data based on the weight group and the prediction model learned from the learner 120. To this end, the predictor 130 may receive the weight group and the prediction model from the weight model database 103. The predictor 130 may calculate the prediction result by analyzing a time-series trend of the preprocessed time-series data. The prediction result may be stored in a prediction result database 104. The prediction result database 104 may be implemented in a server or a storage medium that is outside or inside the time-series data processing device 100.

Figure 2:
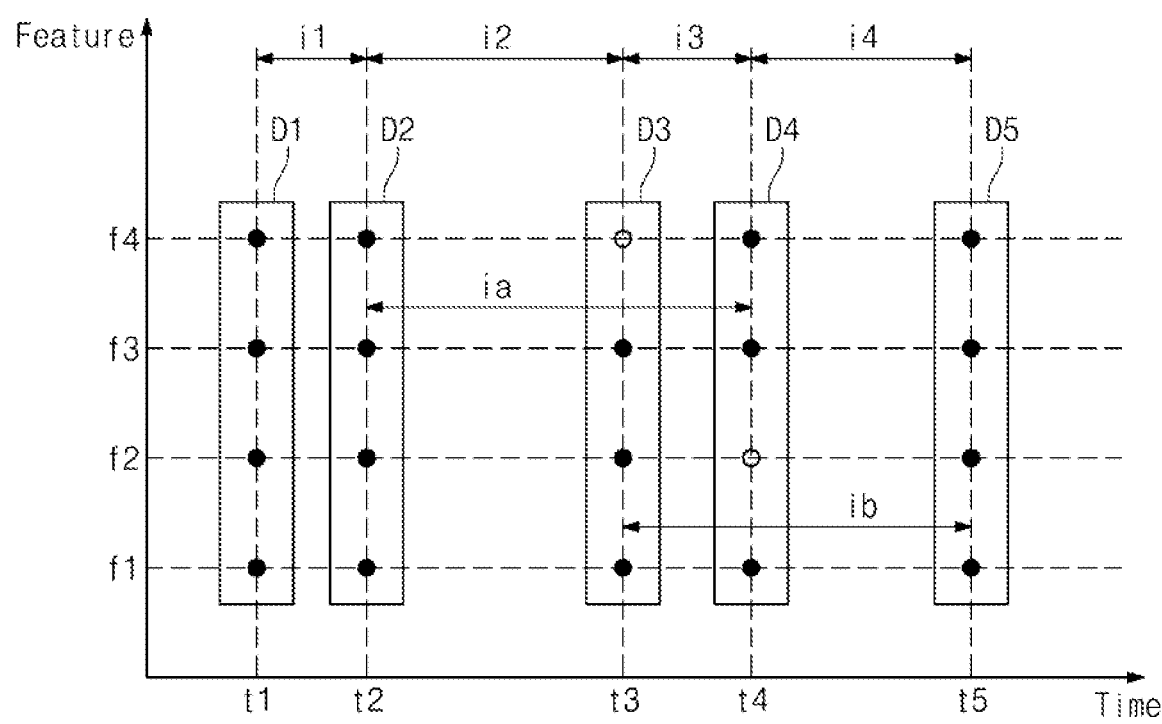
FIG. 2 is a graph illustrating time-series irregularity of the time-series data described in FIG. 1 and feature irregularity according to a missing value.

FIG. 2 is a graph illustrating time-series irregularity of the time-series data described in FIG. 1 and feature irregularity according to a missing value. A horizontal axis is defined as time, and a vertical axis is defined as a feature. Referring to FIG. 2, it is assumed that time-series data includes first to fifth data D1 to D5 arranged in a time-series manner. It is assumed that the time-series data includes first to fourth features f1 to f4. For convenience of description, it is assumed that the time-series data of FIG. 2 includes medical data.

The time-series data may be composed of two dimensions of a time and a feature. That is, the time-series data may include a plurality of features f1 to f4 corresponding to each of a plurality of times t1 to t5. A prediction result corresponding to a future time point may be calculated by analyzing the time-series data. To improve accuracy and reliability of the prediction result, a prediction model considering both a time and a feature may be required. The time-series data processing device 100 of FIG. 1 may perform learning and prediction by reflecting both the time and the feature of time-series data. This will be more fully described later.

The time-series data may have an irregular time interval. The first to fifth data D1 to D5 may be generated, measured, or recorded at first to fifth times t1 to t5, respectively. For example, the first to fifth times t1 to t5 may be points in time when a diagnosis, treatment, or prescription is made at medical institutions. As illustrated in FIG. 2, first to fourth time intervals i1 to i4 between the first to fifth times t1 to t5 may be irregular. The reason is that visits to medical institutions are irregular. In a general time-series analysis, it is assumed that a time interval is constant, like data collected at a specific time through a sensor. In the analysis, an irregular time interval may not be considered. The time-series data processing device 100 of FIG. 1 may perform learning and prediction by reflecting an irregular time interval. This will be more fully described later.

The time-series data may have a missing value. For example, the third data D3 may not include the fourth feature f4, and the fourth data D4 may not include the second feature f2. These features may be defined as missing values. The features of the time-series data may be generated based on diagnosis, treatment, prescription, or the like. Medical institutions may not always perform the same test, and thus a missing value may occur in the time-series data. When the time-series data is analyzed, the missing value reduces the accuracy and reliability of the prediction result or learning result. The time-series data processing device 100 of FIG. 1 may perform learning and prediction in consideration of the missing value of time-series data. This will be more fully described later.

Separately from irregular time intervals of the first to fifth data D1 to D5, irregularity (feature irregularity) of a time interval of each of features due to a missing value may occur. Due to the missing value, the time interval of each of features may be different from the time interval of the first to fifth data D1 to D5. For example, the fourth feature f4 may have the first time interval i1, a fifth time interval ia, and the fourth time interval i4 due to the missing value of the third data D3. The fifth time interval ia may be the sum of the second time interval i2 and the third time interval i3. For example, the second feature f2 may have the first time interval i1, the second time interval i2, and a sixth time interval ib due to the missing value of the fourth data D4. The sixth time interval ib may be the sum of the third time interval i3 and the fourth time interval i4. The irregular time interval of each of the features reduces the accuracy and reliability of the prediction result or learning result. The time-series data processing device 100 of FIG. 1 may perform learning and prediction in consideration of feature irregularity due to a missing value. This will be more fully described later.

Figure 3:
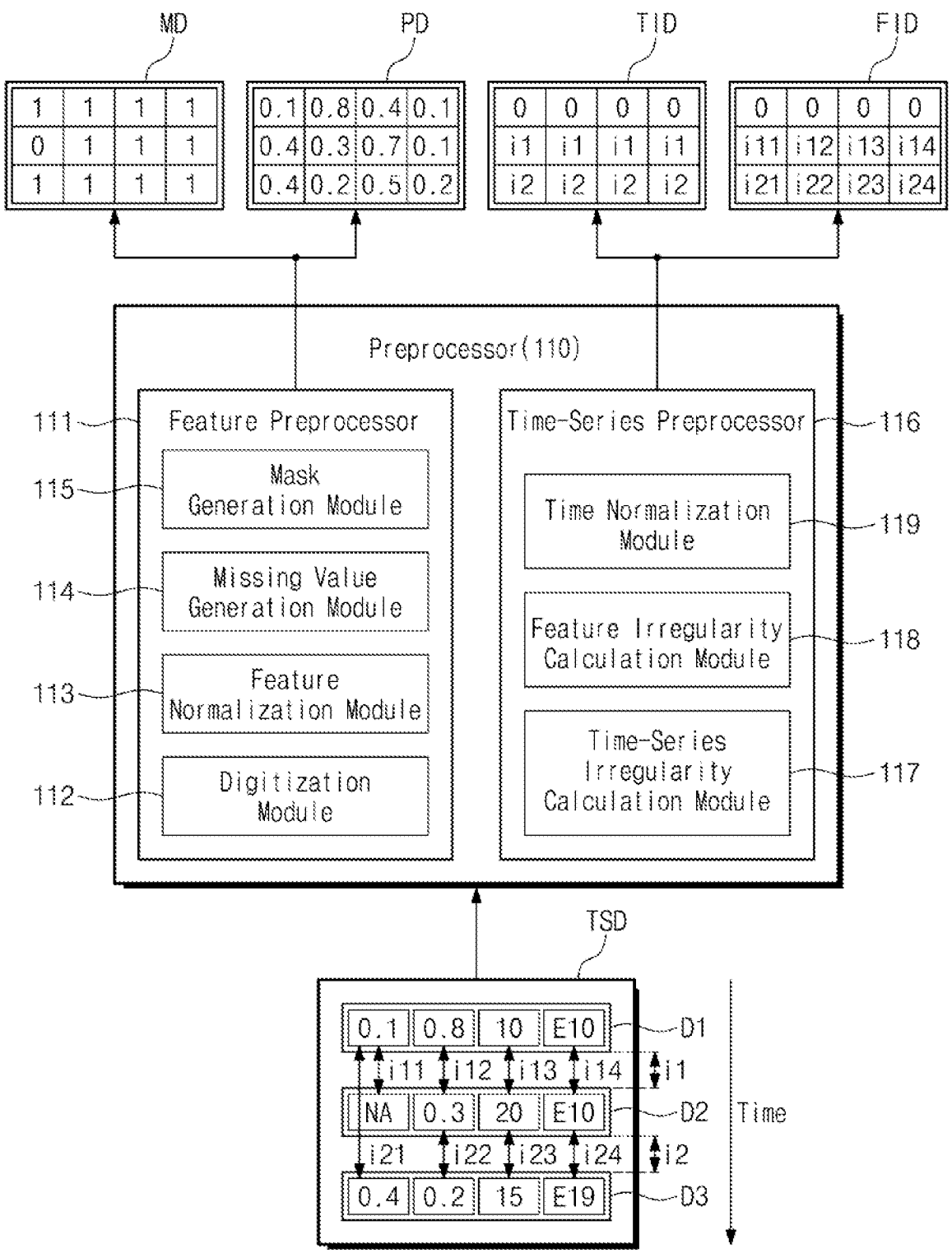
FIG. 3 is a block diagram of the preprocessor of FIG. 1.

FIG. 3 is a block diagram of the preprocessor of FIG. 1. It may be understood that a block diagram of FIG. 3 is a configuration that preprocesses time-series data TSD in consideration of complexity of the time and feature described in FIG. 2, existence of a missing value, and an irregular time interval. Referring to FIG. 3, the preprocessor 110 may include a feature preprocessor 111 and a time-series preprocessor 116. As described in FIG. 1, the feature preprocessor 111 and the time-series preprocessor 116 may be implemented in hardware, firmware, software, or the combination thereof.

The feature preprocessor 111 and the time-series preprocessor 116 receive the time-series data TSD. The time-series data TSD may be data for learning of a prediction model or data for calculating a prediction result through the learned prediction model. For example, the time-series data TSD includes first to third data D1 to D3. Each of the first to third data D1 to D3 may include first to fourth features. Herein, the second data D2 does not include a first feature f1.

The feature preprocessor 111 may generate interpolation data PD by preprocessing the time-series data TSD. The interpolation data PD may include features of the time-series data TSD that are converted to have the same type. The interpolation data PD may have the same number of times and the same number of features as the time-series data TSD. The interpolation data PD may be time-series data obtained by interpolating a missing value. When the features of the time-series data TSD have the same type as one another and the missing value is interpolated, time-series analysis by the learner 120 or the predictor 130 of FIG. 1 may be easy. To generate the interpolation data PD, a digitization module 112, a feature normalization module 113, and a missing value generation module 114 may be implemented in the feature preprocessor 111.

The feature preprocessor 111 may generate masking data MD for distinguishing between a missing value and an actual value of the time-series data TSD. The masking data MD may have the same number of times and the same number of features as the time-series data TSD. When time-series analysis is made, the masking data MD may be generated such that the missing value is not treated with the same importance as the actual value. To generate the masking data MD, a mask generation module 115 may be implemented in the feature preprocessor 111.

The digitization module 112 may convert types of non-numeric features into numeric types in the time-series data TSD. The non-numeric types may include code types or categorical types (e.g., -, +, ++, or the like). For example, EMR data may have a data type defined depending on a specific disease, prescription, or test, but a numerical type and a non-numeric type may be mixed in the EMR data. For example, a fourth feature of each of the first to third data D1 to D3 has non-numeric values E10, E10, and E19. The digitization module 112 may convert the fourth features E10, E10, and E19 of the time-series data TSD into a numeric type such as the fourth features 0.1, 0.1, or 0.2 of the interpolation data PD. For example, the digitization module 112 may digitize the features using an embedding manner such as Word2Vec.

The feature normalization module 113 may convert values of the time-series data TSD into values in a reference range. For example, the reference range may include a value between 0 and 1 or between −1 and 1. The time-series data TSD may have a value in an independent range depending on a feature. For example, the third feature of each of the first to third data D1 to D3 has numerical values 10, 20, and 15 that are out of the reference range. The feature normalization module 113 may normalize the third features 10, 20, and 15 of the time-series data TSD within the same reference range as the third features 0.4, 0.7, and 0.5 of the interpolation data PD.

The missing value generation module 114 may put an interpolation value into a missing value of the time-series data TSD. The interpolation value may have a predetermined value or may be generated based on another value of the time-series data TSD. For example, the interpolation value may have 0, an intermediate value or an average value of features at another time, or a feature value at an adjacent time. For example, the first feature of the second data D2 has a missing value. For example, the missing value generation module 114 may set the interpolation value to 0.4, which is the first feature value of the third data D3 temporally adjacent to the second data D2.

The mask generation module 115 generates the masking data MD based on the missing value. The mask generation module 115 may generate the masking data MD by differently setting a value corresponding to a missing value and a value corresponding to other values (actual values). For example, a value corresponding to a missing value may be 0, and a value corresponding to an actual value may be 1.

The time-series preprocessor 116 may generate time-series interval data TID based on the time interval of the time-series data TSD. The time-series interval data TID may include time interval information between times of the time-series data TSD. The time-series interval data TID may have the same number of values as the time-series data TSD in a time dimension. The time-series interval data TID may have the same number of values as the time-series data TSD in a feature dimension, or may have one value. For example, the first data D1 and the second data D2 may have a first time interval i1; and, the second data D2 and the third data D3 may have a second time interval i2. When time-series analysis is made, the time-series interval data TID may be generated to consider time-series irregularity. To generate the time-series interval data TID, a time-series irregularity calculation module 117 and a time normalization module 119 may be implemented in the time-series preprocessor 116.

The time-series preprocessor 116 may generate feature interval data FID based on a time interval of each of the features of the time-series data TSD. The feature interval data FID may include time interval information between the features of the time-series data TSD. The feature interval data FID may have the same number of times and features as the time-series data TSD. For example, the second to fourth features may have time intervals i12, i13, and i14 such as the first time interval it and time intervals i22, i23, and i24 such as the second time interval i2. Because the first feature of the second data D2 is a missing value, the first feature may have a time interval i21 the same as the sum of the first time interval i11 and the second time interval i2. When time-series analysis is made, the feature interval data FID may be generated to consider an irregular time interval of each of the features. To generate the feature interval data FID, a feature irregularity calculation module 118 and the time normalization module 119 may be implemented in the time-series preprocessor 116.

The time-series irregularity calculation module 117 may calculate irregularity of the time-series data TSD. The irregularity calculation module 117 may calculate a time interval based on a difference between a time of specific data and a time of preceding data. The preceding data refers to data that temporally precedes the specific data. For example, the first data D1 and the second data D2 may have the first time interval i1; and, the second data D2 and the third data D3 may have the second time interval i2. A value corresponding to the second data D2 of the time-series interval data TID may be determined based on the first time interval i1. A value corresponding to the third data D3 of the time-series interval data TID may be determined based on the second time interval i2. Moreover, when the first data D1 corresponds to an initial time of the time-series data TSD, an initial value (e.g., 0) may be a value corresponding to the first data D1 of the time-series interval data TID.

The feature irregularity calculation module 118 may calculate time-series irregularity of each of the features. The feature irregularity calculation module 118 may calculate a time interval based on a difference between a time of a specific feature and a time of a preceding feature. The preceding feature is a feature with an actual value, and refers to a feature of preceding data that temporally precedes data of a specific feature. at which an actual value is present. For example, the second feature of the first data D1 and the second feature of the second data D2 may have the first time interval i12; and, the second feature of the second data D2 and the second feature of the third data D3 may have the second time interval i22. The first time interval i12 and the second time interval i22 may be the same as the first time interval it and the second time interval i2 of the time-series data TSD, respectively. A value corresponding to the second feature of the second data D2 in the feature interval data FID may be determined based on the first time interval i12. A value corresponding to the second feature of the third data D3 in the feature interval data FID may be determined based on the second time interval i22.

Meanwhile, because the first feature of the second data D2 is a missing value, the second time interval i21 of the first feature may be the sum of the first time interval it and the second time interval i2 of the time-series data TSD. In this case, a value corresponding to the first feature of the third data D3 in the feature interval data FID may be determined based on the second time interval i21. Furthermore, a value corresponding to the missing value in the feature interval data FID may be determined based on the first time interval i11 that is a time interval between the missing value and the first feature (an actual value) of the first data D1. When the first data D1 corresponds to an initial time of the time-series data TSD, the initial value (e.g., 0) may be a value corresponding to the first to fourth features of the feature interval data FID.

The time normalization module 119 may normalize the irregularity calculated from the time-series irregularity calculation module 117 and the feature irregularity calculation module 118. The time normalization module 119 may convert a value calculated from the time-series irregularity calculation module 117 and the feature irregularity calculation module 118 into a value in a reference range. For example, the reference range may include a value between 0 and 1 or between −1 and 1. The time digitized as a year, a month, a day, or the like may be out of a reference range; the time normalization module 119 may normalize the corresponding time to a time in a reference range.

Figure 4:
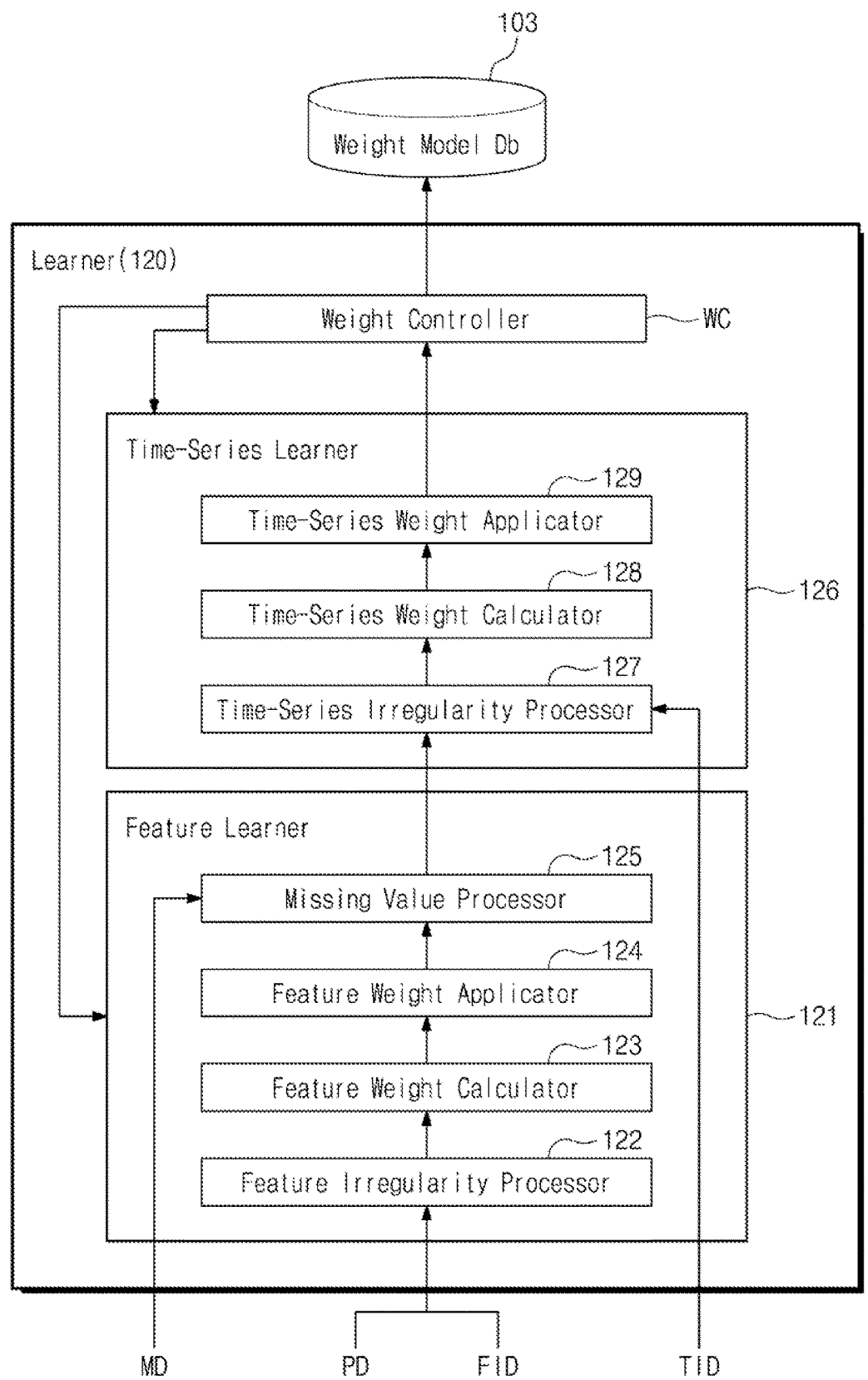
FIG. 4 is a block diagram of the learner of FIG. 1.

FIG. 4 is a block diagram of the learner of FIG. 1. It may be understood that the block diagram of FIG. 4 is a configuration that learns a prediction model and determines a weight group based on preprocessed time-series data. Referring to FIG. 4, the learner 120 may include a feature learner 121, a time-series learner 126, and a weight controller WC. As described in FIG. 1, the feature learner 121, the time-series learner 126, and the weight controller WC may be implemented in hardware, firmware, software, or the combination thereof.

The feature learner 121 analyzes each of the features of the time-series data based on the interpolation data PD (preprocessed time-series data), the masking data MD, and the feature interval data FID that are generated from the preprocessor 110 of FIG. 3. The feature learner 121 may generate a parameter group for generating a feature weight by learning at least part of the prediction model. The parameter group (a feature parameter) is included in a weight group. The feature weight depends on a time and a feature of the time-series data.

The feature weight may include a weight of each of a plurality of features corresponding to a specific time. That is, it may be understood that the feature weight is an index, which is calculated based on the feature parameter and which is used to determine importance of feature values included in the time-series data. A time from the measurement time of the previous feature value to the measurement time of the feature value may be reflected to a feature weight through the feature interval data FID. To the end, a feature irregularity processor 122, a feature weight calculator 123, a feature weight applicator 124, and a missing value processor 125 may be implemented in the feature learner 121.

The feature irregularity processor 122 may generate encoding data by encoding the feature interval data FID and the interpolation data PD. The feature irregularity processor 122 may generate the encoding data by correcting an interpolation value of the interpolation data PD based on the feature interval data FID. The feature irregularity processor 122 may correct an irregular time interval of each of the features according to a missing value by reflecting the feature interval data FID to the interpolation data PD. To this end, the feature irregularity processor 122 may merge the feature interval data FID and the interpolation data PD and may encode the merged data. The detailed operation of the feature irregularity processor 122 will be described later with reference to FIGS. 5 to 7.

The feature weight calculator 123 may calculate a feature weight corresponding to each of the features of the interpolation data PD based on the encoding data generated from the feature irregularity processor 122. The feature weight may have the same number of values as the number of features of the interpolation data PD in a time dimension and a feature dimension. The feature weight calculator 123 may reflect the importance of each of values included in the interpolation data PD and the importance of each of features according to an irregular time interval between features to the feature weight. For example, the feature weight calculator 123 may generate a feature weight so as to pay attention to a feature, in which the prediction result is specified, by using an attention mechanism. The detailed operation of the feature weight calculator 123 will be described later with reference to FIG. 5.

The feature weight applicator 124 may apply a feature weight calculated from the feature weight calculator 123 to the interpolation data PD. Depending on the result of application, the feature weight applicator 124 may generate a feature application result in which the complexity of a time and a feature is reflected to the interpolation data PD. For example, the feature weight applicator 124 may multiply a feature weight corresponding to a specific time and feature by a feature corresponding to the interpolation data PD. However, the present disclosure is not limited thereto, and the feature weight may be applied to the above-described encoding data or an intermediate result in which the feature weight calculator 123 analyzes the encoding data, instead of the interpolation data PD. The specific operation of the feature weight applicator 124 will be described later with reference to FIG. 5.

The missing value processor 125 may generate a first learning result by correcting the feature application result based on the masking data MD. The missing value processor 125 may generate the first learning result by applying or reflecting the masking data MD to the feature application result. When the feature irregularity processor 122 is a configuration that improves the reliability of trend analysis of each of features by adjusting the importance of the feature following a missing value, the missing value processor 125 may be understood as a configuration that relatively lowers the importance of the missing value and increases the importance of the actual value. The detailed operation of the missing value processor 125 will be described later with reference to FIG. 5.

The time-series learner 126 analyzes a time flow of the time-series data based on the first learning result generated from the feature learner 121. When the feature learner 121 analyzes the importance of each of the features of the time-series data and the trend of each of the features, the time-series learner 126 may analyze an overall trend of data according to the passage of time or a relationship between a prediction time point and a specific time point. The time-series learner 126 may generate a parameter group for generating a time-series weight by learning at least part of the prediction model. The parameter group (a time-series parameter) is included in the weight group.

The time-series weight may include a weight of each of a plurality of times of the time-series data. Namely, it may be understood that the time-series weight is an index which is calculated based on a time-series parameter and which is used to determine the importance of times of the time-series data. To this end, a time-series irregularity processor 127, a time-series weight calculator 128, and a time-series weight applicator 129 may be implemented in the time-series learner 126.

The time-series irregularity processor 127 may generate encoding data for correcting irregularity of a time interval of the time-series data by encoding the time-series interval data TID. Alternatively, the time-series irregularity processor 127 may generate encoding data by reflecting the time-series interval data TID to the first learning result. The encoded data may be used to adjust the importance of the first learning result or each of the times of the time-series data. The detailed operation of the time-series irregularity processor 127 will be described later with reference to FIG. 8.

The time-series weight calculator 128 may calculate a time-series weight corresponding to a plurality of times based on the first learning result and the encoding data generated from the time-series irregularity processor 127. The time-series weight may have the same number of values as the first learning result in a time dimension, but may have one value in a feature dimension. The time-series weight calculator 128 may reflect the importance of each of the times corresponding to the predicted time to the time-series weight. For example, the time-series weight calculator 128 may generate a time-series weight so as to pay attention to a time, at which the prediction result is specified, by using an attention mechanism. The detailed operation of the time-series weight calculator 128 will be described later with reference to FIG. 8.

The time-series weight applicator 129 may apply the time-series weight calculated from the time-series weight calculator 128 to the first learning result. Depending on the result of application, the time-series weight applicator 129 may generate a second learning result to which irregularity of a time interval and a time-series trend are reflected. For example, the time-series weight applicator 129 may multiply a time-series weight corresponding to a specific time by features of a first learning result corresponding to a specific time. However, the present disclosure is not limited thereto, and the time-series weight may be applied to an intermediate result, in which the time-series weight calculator 128 analyzes the first learning result, instead of the first learning result. The detailed operation of the time-series weight applicator 129 will be described later with reference to FIG. 8.

The weight controller WC may adjust a feature parameter and a time-series parameter based on the second learning result. The weight controller WC may determine whether the second learning result corresponds to the desired actual result. The weight controller WC may adjust the feature parameter and the time-series parameter such that the second learning result reaches the desired actual result. The feature learner 121 and the time-series learner 126 may repeatedly analyze the preprocessed time-series data based on the adjusted feature parameter and the adjusted time-series parameter. Such the feature parameter and the time-series parameter may be stored in the weight model database 103. Unlike the illustration of FIG. 4, the weight controller WC may further receive a first learning result from the feature learner 121 and may adjust a feature parameter based on the first learning result.

Figure 5:
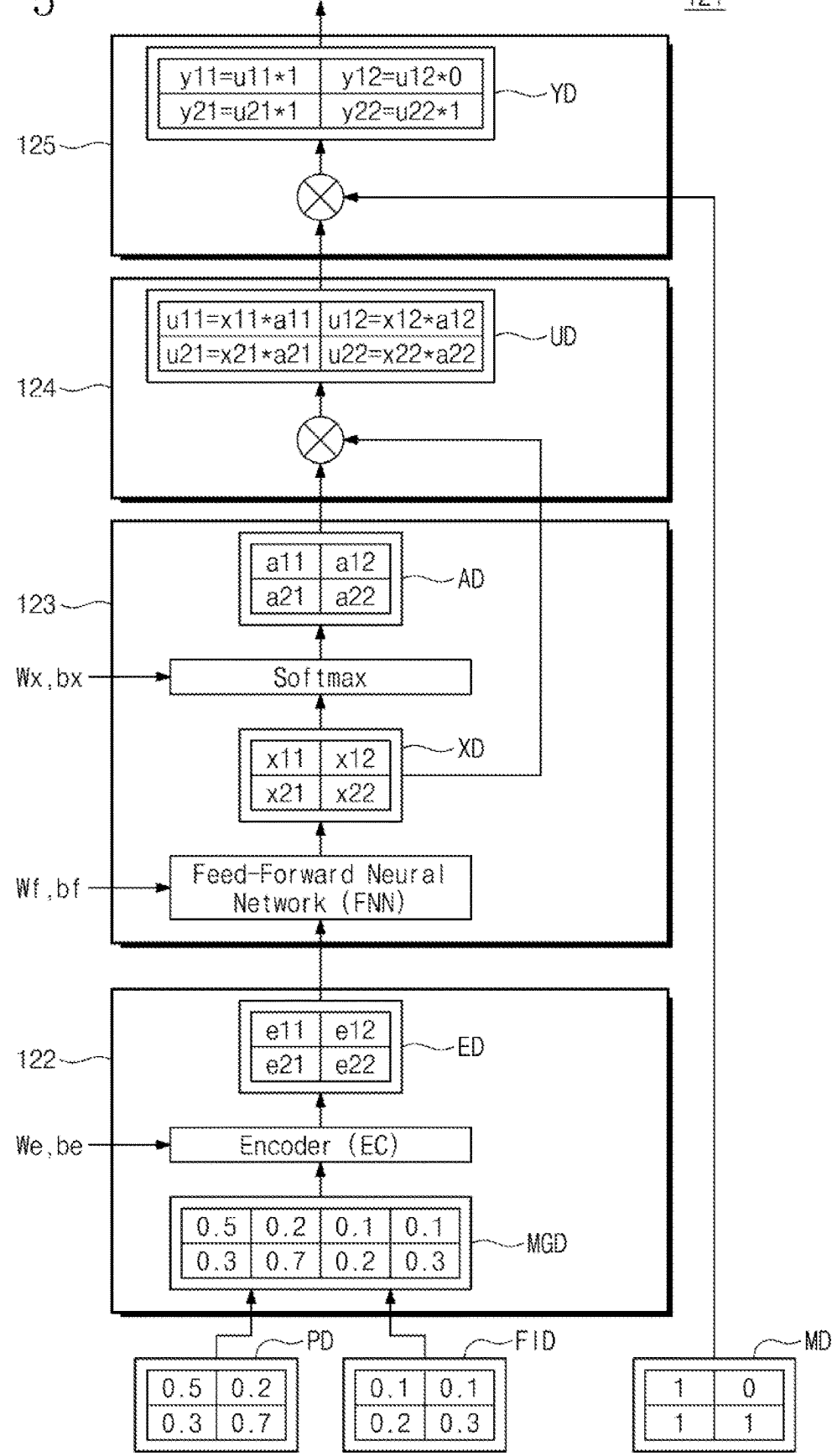
FIG. 5 is a diagram illustrating the feature learner of FIG. 4 in detail.

FIG. 5 is a diagram illustrating the feature learner of FIG. 4 in detail. Referring to FIG. 5, the feature learner 121 may be implemented with the feature irregularity processor 122, the feature weight calculator 123, the feature weight applicator 124, and the missing value processor 125, and may correspond to the feature irregularity processor 122, the feature weight calculator 123, the feature weight applicator 124, and the missing value processor 125 in FIG. 4.

The feature irregularity processor 122 may generate merged data MGD by merging the interpolation data PD and the feature interval data FID. The merged data MGD may be data obtained by simply arranging values of the interpolation data PD and the feature interval data FID. However, the present disclosure is not limited thereto. The merged data MGD may be data obtained by classifying the interpolation data PD and the feature interval data FID based on features and merging the classified values based on features. For example, the merged data MGD may have the same number of values in a time dimension as the interpolation data PD and the feature interval data FID, and may have double values in a feature dimension.

The feature irregularity processor 122 may generate encoding data ED by encoding the merged data MGD. For encoding, the feature irregularity processor 122 may include an encoder EC. For example, the encoder EC may be implemented with a 1D convolution layer or an auto-encoder. When being implemented with the 1D convolution layer, the encoder EC may generate the encoding data ED through a kernel for applying a weight We to each of values of the merged data MGD and summing the values to which the weight We is applied. When being implemented with the auto-encoder, the encoder EC may generate the encoding data ED based on an encoding function to which the weight We and a bias be are applied. The weight We and the bias be may be included in the above-described feature parameter, and may be generated by the learner 120. The encoding data ED may have the same number of values as the interpolation data PD or the feature interval data FID.

The feature weight calculator 123 may generate a feature weight AD so as to pay attention to a feature, in which the prediction result is specified, by using an attention mechanism. For example, the feature weight calculator 123 may analyze the features of the encoding data ED through a feed-forward neural network. The encoding data ED may be a result of reflecting the irregularity of a time interval of each of the features to the interpolation data PD by the feature interval data FID. The feed-forward neural network may analyze the encoding data ED based on a weight Wf and a bias bf. The weight Wf and the bias bf may be included in the above-described feature parameter, and may be generated by the learner 120. The feature weight calculator 123 may generate feature analysis data XD by analyzing the encoding data ED. The feature analysis data XD may have the same number of values as the interpolation data PD.

The feature weight calculator 123 may calculate the feature weight AD by applying the feature analysis data XD to a softmax function. In this case, a weight Wx and a bias bx may be applied to the corresponding function. For example, the feature weight calculator 123 may generate the feature weight AD by calculating a formula "AD=softmax(tanh(Wx*XD+bx))". The weight Wx and the bias bx may be included in the above-described feature parameter, and may be generated by the learner 120. For example, the feature weight AD may have the same number of values as the feature analysis data XD.

The feature weight applicator 124 may apply the feature weight AD to the feature analysis data XD. For example, the feature weight applicator 124 may generate a feature application result UD by multiplying the feature weight AD by the feature analysis data XD. However, the present disclosure is not limited thereto. The feature weight AD may be applied to the interpolation data PD or the encoding data ED instead of the feature analysis data XD.

The missing value processor 125 may apply the masking data MD to the feature application result UD. For example, the missing value processor 125 may generate a first learning result YD by multiplying the masking data MD by the feature application result UD. In this case, a value corresponding to the missing value in the feature application result UD may be replaced with "0". It may be understood that the replacing is used to significantly lower the importance of the missing value through the masking data MD, without using an interpolation value of a missing value of the interpolation data PD for analysis as it is. However, the present disclosure is not limited thereto. The missing value processor 125 may process a missing value in various manners by using the masking data MD. For example, like the encoding method of the feature irregularity processor 122 described above, the missing value processor 125 may merge the feature application result UD and the masking data MD and may generate the first learning result YD by encoding the merged data.

In FIG. 5, it is illustrated that the missing value processor 125 processes the feature application result UD to generate the first learning result YD. However, the configuration of the feature learner 121 is not limited thereto. For example, the missing value processor 125 may apply the masking data MD to the feature weight AD generated from the feature weight calculator 123, and then the feature weight applicator 124 may apply the interpolation data PD, the encoding data ED, or the feature analysis data XD to the application result of the missing value processor 125, thereby generating the first learning result. For example, the missing value processor 125 may apply the masking data MD to the interpolation data PD, the encoding data ED, or the feature analysis data XD, and then the feature weight applicator 124 may apply the feature weight AD to the application result of the missing value processor 125, thereby generating the first learning result. That is, an order in which the feature learner 121 processes data is not limited to the embodiment of FIG. 5.

Figure 6:
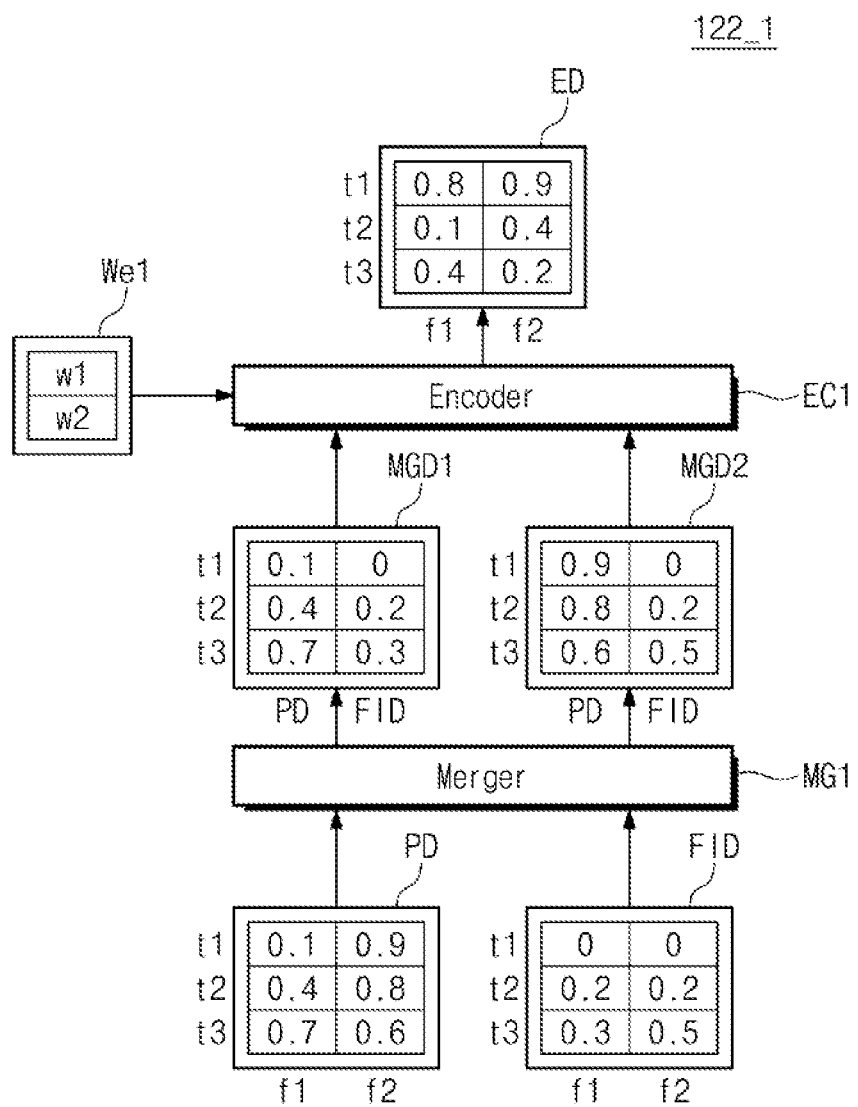
FIG. 6 is a diagram of the feature irregularity processor of FIG. 4 or 5.

FIG. 6 is a diagram of the feature irregularity processor of FIG. 4 or 5. A feature irregularity processor 122_1 of FIG. 6 may be applied to the feature irregularity processor 122 of FIG. 4 or 5. Referring to FIG. 6, the feature irregularity processor 122_1 may include a merger MG1 and an encoder EC1. For convenience of description, it is assumed that the interpolation data PD and the feature interval data FID having two features f1 and f2 corresponding to three times t1, t2, and t3 are processed.

The merger MG1 may merge the interpolation data PD and the feature interval data FID. The merger MG1 may generate first merged data MGD1 and second merged data MGD2 by merging the interpolation data PD and the feature interval data FID in an element-wise way. The merger MG1 may generate the first merged data MGD1 by classifying values corresponding to the first feature f1 in the interpolation data PD and the feature interval data FID. The merger MG1 may generate the second merged data MGD2 by classifying values corresponding to the second feature f2 in the interpolation data PD and the feature interval data FID.

The encoder EC1 may encode the first merged data MGD1 and the second merged data MGD2 based on a weight matrix We1. For example, the encoder EC1 may generate the encoding data ED corresponding to the first feature f1 by perform matrix multiplication on the weight matrix We1 and the first merged data MGD1 and may generate the encoding data ED corresponding to the second feature f2 by perform matrix multiplication on the weight matrix We1 and the second merged data MGD2. It is illustrated that the dimension of the weight matrix We1 is 2*1, but is not limited thereto. For example, the dimension of the weight matrix We1 may be 2*n ('n' is a natural number). Unlike the weight matrix We1 in FIG. 6, the weight matrix We1 is provided as an encoding function for an operation of the auto-encoder described above or may be provided in a form of a kernel of a 1D convolution layer. In a learning stage, the weight matrix We1 may be learned and adjusted in a back-propagation scheme.

Figure 7:
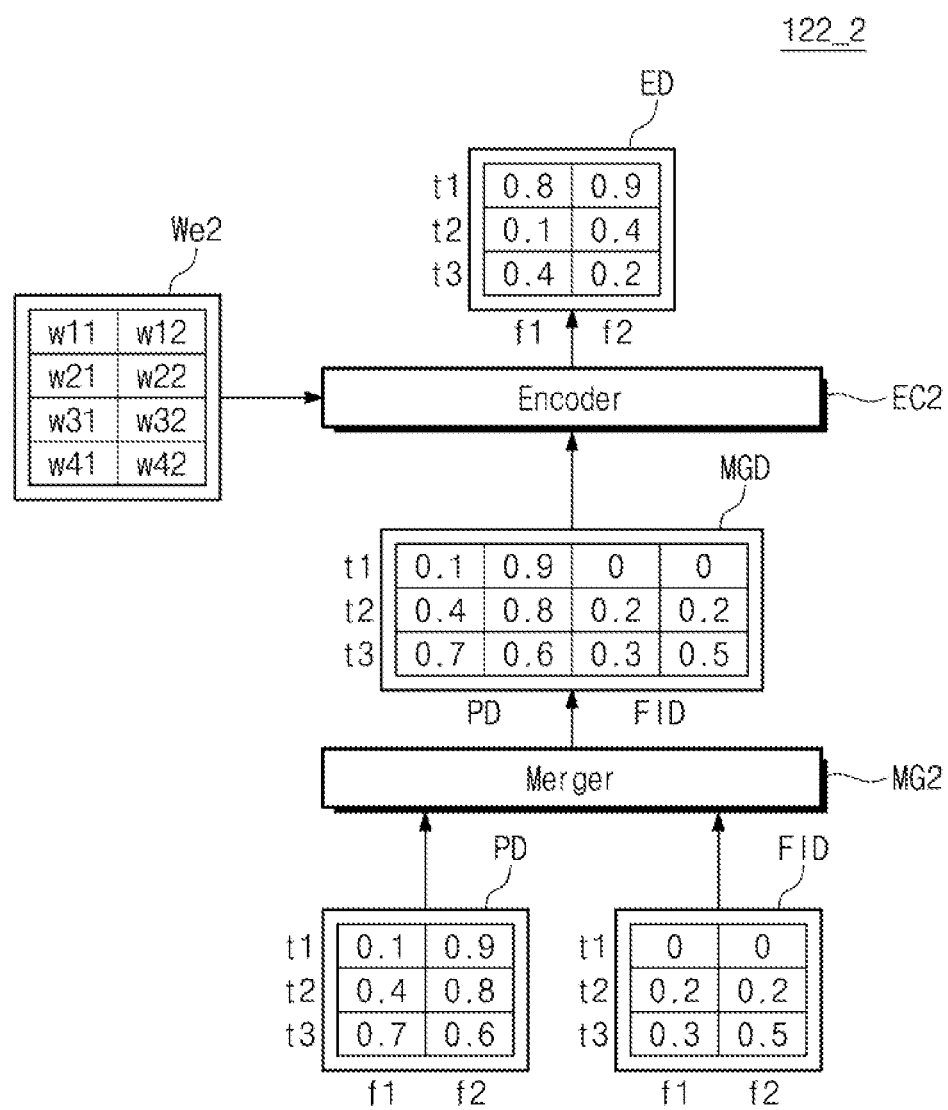
FIG. 7 is a diagram of the feature irregularity processor of FIG. 4 or 5.

FIG. 7 is a diagram of the feature irregularity processor of FIG. 4 or 5. A feature irregularity processor 122_2 of FIG. 7 may be applied to the feature irregularity processor 122 of FIG. 4 or 5. Referring to FIG. 7, the feature irregularity processor 122_2 may include a merger MG2 and an encoder EC2. For convenience of description, it is assumed that the interpolation data PD and the feature interval data FID having two features f1 and f2 corresponding to three times t1, t2, and t3 are processed.

The merger MG2 may generate merged data MGD by simply merging the interpolation data PD and the feature interval data FID. The merged data MGD may include values of the interpolation data PD and the feature interval data FID.

The encoder EC2 may encode the merged data MGD based on a weight matrix We2. For example, the encoder EC2 may generate the encoding data ED by perform matrix multiplication on the weight matrix We2 and the merged data MGD. It is illustrated that the dimension of the weight matrix We2 is 4*2, but is not limited thereto. For example, the dimension of the weight matrix We2 may be 4*n ('n' is a natural number). Unlike the weight matrix We2 in FIG. 7, the weight matrix We2 is provided as an encoding function for an operation of the auto-encoder described above or may be provided in a form of a kernel of a 1D convolution layer. In a learning stage, the weight matrix We2 may be learned and adjusted in a back-propagation scheme.

Figure 8:
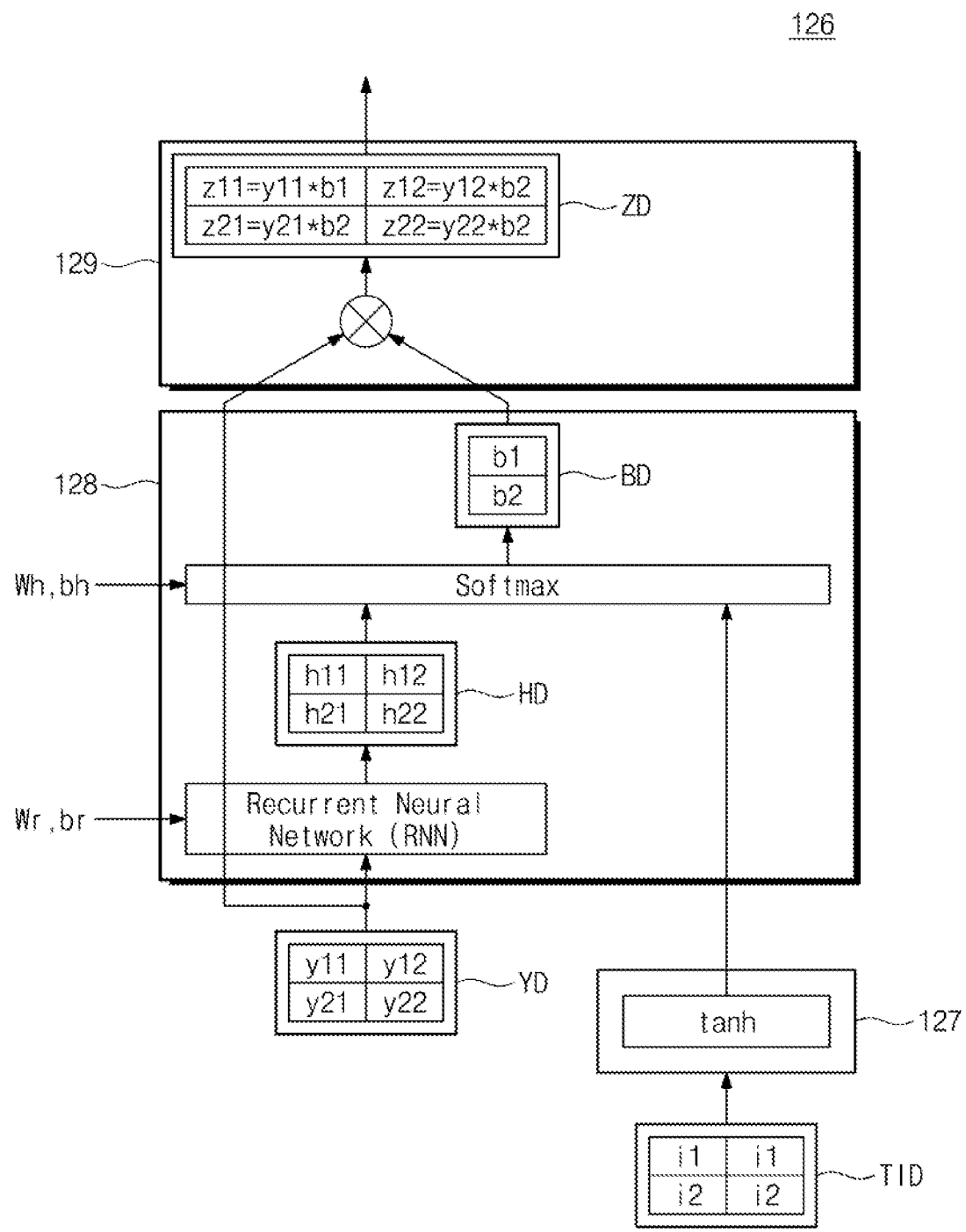
FIG. 8 is a diagram illustrating the time-series learner of FIG. 4 in detail.

FIG. 8 is a diagram illustrating the time-series learner of FIG. 4 in detail. Referring to FIG. 8, the time-series learner 126 may be implemented with the time-series irregularity processor 127, the time-series weight calculator 128, and the time-series weight applicator 129, and may correspond to the time-series irregularity processor 127, the time-series weight calculator 128, and the time-series weight applicator 129 of FIG. 4.

The time-series irregularity processor 127 may model time-series interval data TID. For example, the time-series irregularity processor 127 may model the time-series interval data TID, using a nonlinear function such as a tanh function. Although not illustrated in FIG. 8, a weight and a bias may be applied to the nonlinear function. The weight and the bias may be included in the above-described time-series parameter, and may be generated by the learner 120. The modeled time-series interval data corresponds to the encoding data described in FIG. 4.

The time-series weight calculator 128 may generate a time-series weight BD so as to pay attention to a time, at which the prediction result is specified, by using an attention mechanism. The time-series weight calculator 128 may analyze a time flow of a first learning result YD through a recurrent neural network. The recurrent neural network may be a kind of time-series analysis algorithm, and may reflect contents of data analysis of the previous time to data of the next time. The first learning result YD may be an analysis result in which the irregularity of an time interval of each of the features due to a missing value is corrected by the above-described feature interval data FID, thereby improving the analysis accuracy of the recurrent neural network. The reason is that the accuracy of analysis by the recurrent neural network is capable of being improved as data having a constant time interval is entered.

The time-series weight calculator 128 may analyze the first learning result YD by applying a weight Wr and a bias br to the recurrent neural network. Herein, the first learning result YD may be the first learning result YD output from the feature learner 121 of FIG. 5. The weight Wr and the bias br may be included in the above-described time-series parameter, and may be generated by the learner 120. The time-series weight calculator 128 may generate a time-series analysis data HD by analyzing the first learning result YD. The time-series analysis data HD may have the same number of values as the interpolation data PD in a time dimension. The time-series analysis data HD may have the identical or different number of values to or from the number of values in the interpolation data PD in a feature dimension.

The time-series weight calculator 128 may calculate the time-series weight BD by applying the time-series analysis data HD and the modeled time-series interval data to a softmax function. In this case, a weight Wh and a bias bh may be applied to the corresponding function. The weight Wh and the bias bh may be included in the above-described feature parameter, and may be generated by the learner 120. The time-series weight BD may have the same number of values as the first learning result YD in the time dimension. The time-series weight BD may have one value corresponding to each of a plurality of times in the feature dimension.

The time-series weight applicator 129 may apply the time-series weight BD to the first learning result YD. For example, the time-series weight applicator 129 may generate a second learning result ZD by multiplying the time-series weight BD and the first learning result YD. However, the present disclosure is not limited thereto. The time-series weight BD may be applied to the time-series analysis data HD instead of the first learning result YD.

Figure 9:
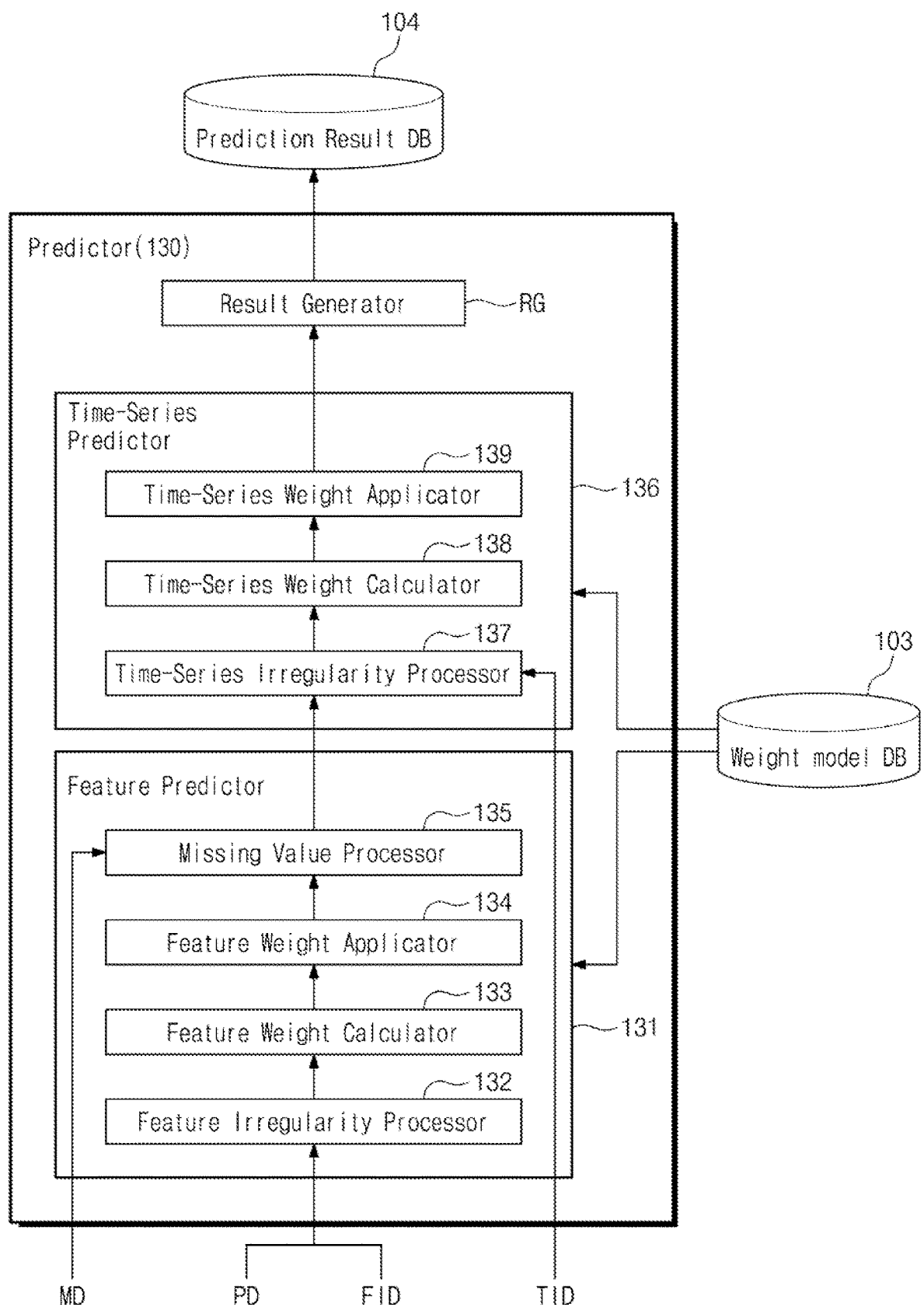
FIG. 9 is a block diagram of the predictor of FIG. 1.

FIG. 9 is a block diagram of the predictor of FIG. 1. It may be understood that a block diagram of FIG. 9 is a configuration that analyzes preprocessed time-series data and generates a prediction result based on a weight group and a prediction model learned by a learner. Referring to FIG. 9, the predictor 130 may include a feature predictor 131, a time-series predictor 136, and a result generator RG. As described in FIG. 1, the feature predictor 131, the time-series predictor 136, and the result generator RG may be implemented in hardware, firmware, software, or the combination thereof.

The feature predictor 131 analyzes each of the features of the time-series data based on the interpolation data PD (preprocessed time-series data), the masking data MD, and the feature interval data FID that are generated from the preprocessor 110 of FIG. 3. A feature irregularity processor 132, a feature weight calculator 133, a feature weight applicator 134, and a missing value processor 135 may be implemented in the feature predictor 131, and may be implemented to be substantially identical to the feature irregularity processor 122, the feature weight calculator 123, the feature weight applicator 124, and the missing value processor 125 in FIG. 4, respectively. On the basis of the feature parameter provided from the weight model database 103, the feature predictor 131 may analyze preprocessed time-series data and may generate a first result.

The time-series predictor 136 analyzes a time flow of the time-series data based on the first result generated from the feature predictor 131. A time-series irregularity processor 137, a time-series weight calculator 138, and a time-series weight applicator 139 may be implemented in the time-series predictor 136, and may be implemented to be substantially identical to the time-series irregularity processor 127, the time-series weight calculator 128, and the time-series weight applicator 129 of FIG. 4, respectively. On the basis of the time-series parameter provided from the weight model database 103, the time-series predictor 136 may analyze the first result and may generate a second result.

The result generator RG may calculate a prediction result corresponding to a prediction time based on the second result generated from the time-series predictor 136. For example, when the time-series data is medical data, the prediction result may indicate a health condition at a specific time point in the future. The prediction result may be stored in the prediction result database 104. For example, the result generator RG may analyze the second result through a fully-connected neural network. The fully-connected neural network may analyze the second result based on a weight and a bias. The weight and the bias may be included in the weight group, and may be generated by the learner 120 of FIG. 1.

Figure 10:
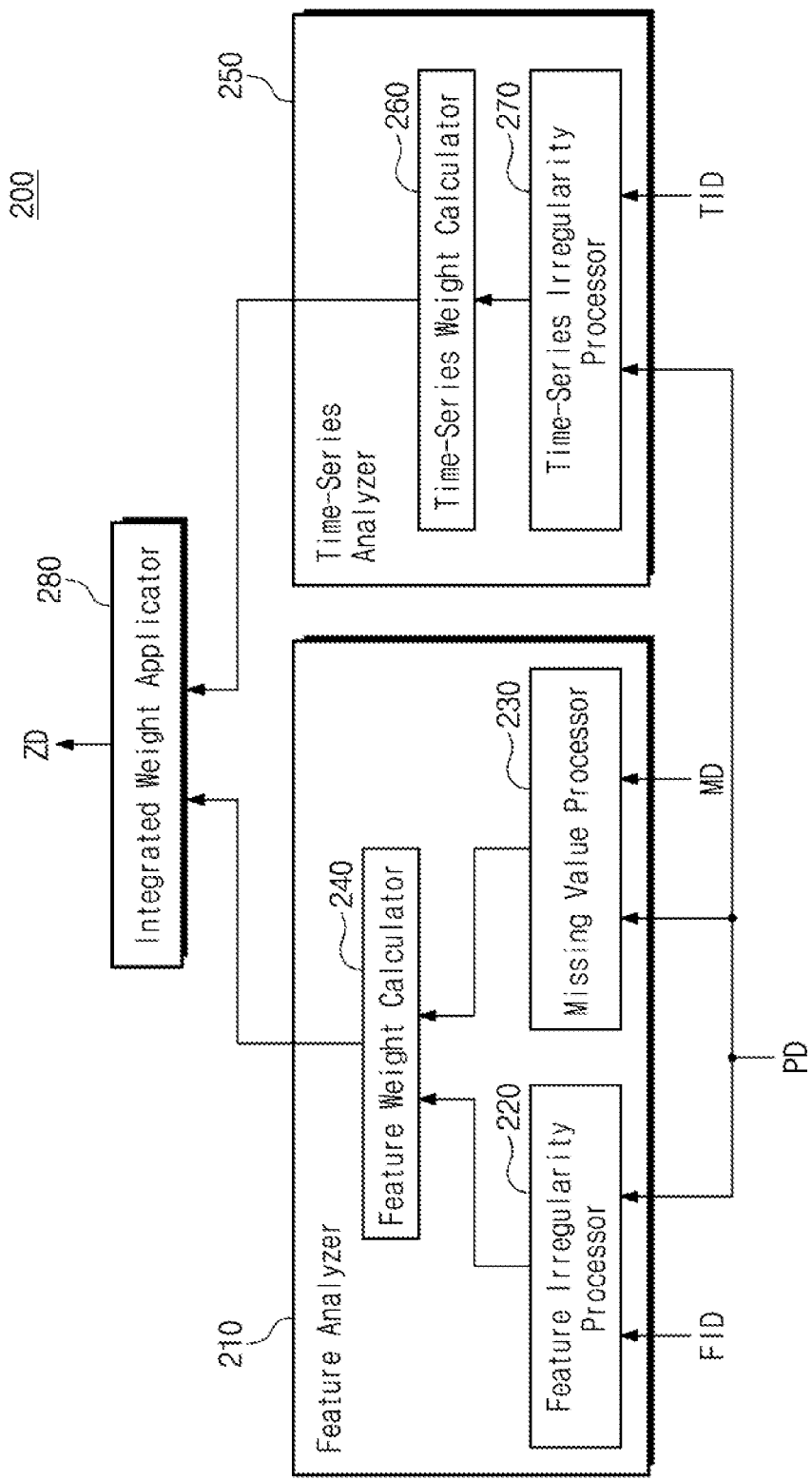
FIG. 10 is a block diagram of a learner or predictor of FIG. 1.

FIG. 10 is a block diagram of a learner or predictor of FIG. 1. An analyzer 200 illustrated in FIG. 10 may be implemented with the learner 120 of FIG. 1 or may be implemented with the predictor 130. Referring to FIG. 10, the analyzer 200 may include a feature analyzer 210, a time-series analyzer 250, and an integrated weight applicator 280. As described in FIG. 1, the feature analyzer 210, the time-series analyzer 250, and the integrated weight applicator 280 may be implemented in hardware, firmware, software, or the combination thereof.

On the basis of the interpolation data PD, the feature interval data FID, and the masking data MD, the feature analyzer 210 analyzes each of the features of the time-series data and generates a feature weight. To this end, a feature irregularity processor 220, a missing value processor 230, and a feature weight calculator 240 may be implemented in the feature analyzer 210.

The feature irregularity processor 220 may correct the interpolation data PD to the feature interval data FID. For example, the feature irregularity processor 220 may generate first encoding data by encoding the feature interval data FID and the interpolation data PD. The operation of the feature irregularity processor 220 may be substantially the same as the operation of the feature irregularity processor 122 described in FIGS. 4 to 7.

The missing value processor 230 may correct the interpolation data PD to the masking data MD. For example, the missing value processor 230 may generate second encoding data by applying the masking data MD to the interpolation data PD. The operation of the missing value processor 230 may be substantially the same as the operation of the missing value processor 125 described in FIGS. 4 and 5. As compared to the missing value processor 125 described in FIGS. 4 and 5, the missing value processor 230 may have a difference in which the application target of the masking data MD is changed to the interpolation data PD in a result of applying a feature.

The feature weight calculator 240 may calculate a feature weight corresponding to each of the features of the interpolation data PD based on the first encoding data and the second encoding data. As described above, the feature weight calculator 240 may generate a feature weight so as to pay attention to a feature, in which the prediction result is specified, by using an attention mechanism. For example, as in the feature weight calculator 123 of FIG. 5, the feature weight calculator 240 may generate feature weights by analyzing features of the first encoding data and the second encoding data through a feed-forward neural network and applying the analyzed data to a softmax function.

On the basis of the interpolation data PD and the time-series interval data TID, the time-series analyzer 250 analyzes a time flow of the time-series data and generates a time-series weight. To this end, a time-series irregularity processor 270 and a time-series weight calculator 260 may be implemented in the time-series analyzer 250.

The time-series irregularity processor 270 may correct the interpolation data PD to the time-series interval data TID. For example, the time-series irregularity processor 270 may generate third encoding data for correcting irregularity of a time interval of the time-series data by encoding the time-series interval data TID. For example, the time-series irregularity processor 270 may generate the third encoding data by encoding the time-series interval data TID and the interpolation data PD. The operation of the time-series irregularity processor 270 may be substantially the same as the operation of the time-series irregularity processor 127 described in FIGS. 4 and 8.

The time-series weight calculator 260 may calculate a time-series weight corresponding to each of the times of the interpolation data PD based on the third encoding data. As described above, the time-series weight calculator 260 may generate a time-series weight so as to pay attention to a time, at which the prediction result is specified, by using an attention mechanism. For example, as in the time-series weight calculator 128 of FIG. 8, the time-series weight calculator 260 may generate a time-series weight by analyzing the interpolation data PD through a recurrent neural network and applying the analyzed data and the third encoding data to a softmax function.

The integrated weight applicator 280 may apply the feature weight calculated from the feature analyzer 210 and the time-series weight calculated from the time-series analyzer 250 to the interpolation data PD. That is, the feature and time of the time-series data may be analyzed in parallel, and the feature weight and the time-series weight may be applied to the time-series data together. Depending on a result of applying a feature weight and a time-series weight, an analysis result ZD may be generated. When the analyzer 200 is implemented with the learner 120 of FIG. 1, a parameter of the weight group may be adjusted based on the analysis result ZD. When the analyzer 200 is implemented with the predictor 130 of FIG. 1, a prediction result corresponding to the prediction time may be generated based on the analysis result ZD.

Figure 11:
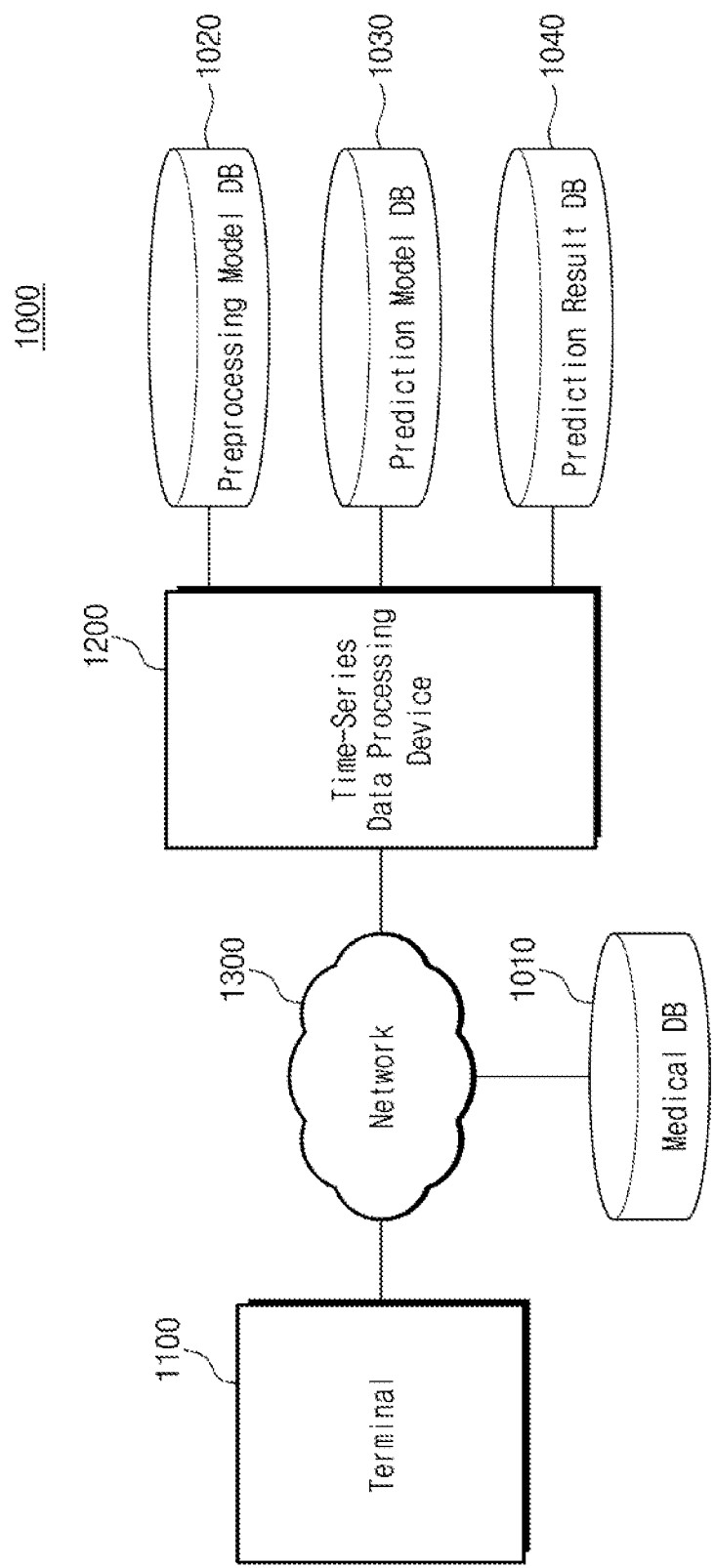
FIG. 11 is a diagram illustrating a health condition prediction system to which the time-series data processing device of FIG. 1 is applied.

FIG. 11 is a diagram illustrating a health condition prediction system to which the time-series data processing device of FIG. 1 is applied. Referring to FIG. 11, a health condition prediction system 1000 includes a terminal 1100, a time-series data processing device 1200, and a network 1300.

The terminal 1100 may collect time-series data from a user and then may provide the time-series data to the time-series data processing device 1200. For example, the terminal 1100 may collect the time-series data from a medical database 1010 or the like. The terminal 1100 may be one of various electronic devices, which are capable of receiving the time-series data from a user, such as a smartphone, a desktop, a laptop PC, a wearable device, and the like. The terminal 1100 may include a communication module or a network interface so as to transmit the time-series data through the network 1300. FIG. 11 illustrates one terminal 1100, but is not limited thereto. For example, the time-series data from a plurality of terminals may be provided to the time-series data processing device 1200.

The medical database 1010 is configured such that medical data for various users is collectively managed. The medical database 1010 may include the learning database 101 or the target database 102 of FIG. 1. For example, the medical database 1010 may receive medical data from public institutions, hospitals, users, and the like. The medical database 1010 may be implemented in a server or a storage medium. The medical data may be managed, grouped, and stored in the medical database 1010 in a time-series manner. The medical database 1010 may periodically provide the time-series data to the time-series data processing device 1200 through the network 1300.

The time-series data may include time-series medical data, such as an electronic medical record (EMR), indicating the health condition of a user generated by diagnosis, treatment, prescription, or the like in medical institutions. The time-series data may be generated when a user visits a medical institution for diagnosis, treatment, prescription, or the like. The time-series data may be data listed in a time-series manner depending on a visit to a medical institution. The time-series data may include a plurality of features generated based on the features for diagnosis, treatment, or prescription. For example, the feature may include data, such as blood pressure, measured by a test or data indicating a degree of a disease such as arteriosclerosis.

The time-series data processing device 1200 may build a learning model through the time-series data received from the medical database 1010 (or the terminal 1100). For example, the learning model may include a prediction model for predicting a future health condition based on the time-series data. For example, the learning model may include a preprocessing model for preprocessing the time-series data. Through the time-series data received from the medical database 1010, the time-series data processing device 1200 may learn a learning model and then may generate a weight group. To this end, the preprocessor 110 and the learner 120 of FIG. 1 may be implemented in the time-series data processing device 1200.

The time-series data processing device 1200 may process the time-series data received from the terminal 1100 or the medical database 1010 based on the built learning model. The time-series data processing device 1200 may preprocess the time-series data based on the built preprocessing model. The time-series data processing device 1200 may analyze the preprocessed time-series data based on the built prediction model. Depending on the analysis result, the time-series data processing device 1200 may calculate a prediction result corresponding to a prediction time. The prediction result may correspond to a user's future health condition. To this end, the preprocessor 110 and the predictor 130 of FIG. 1 may be implemented in the time-series data processing device 1200.

A preprocessing model database 1020 is configured such that a preprocessing model and weight group that are learned and generated by the time-series data processing device 1200 are collectively managed. The preprocessing model database 1020 may be implemented in a server or storage medium. For example, the preprocessing model may include a model for interpolating a missing value for features included in the time-series data.

A prediction model database 1030 is configured such that a prediction model and a weight group that are learned and generated by the time-series data processing device 1200 are collectively managed. The prediction model database 1030 may include the weight model database 103 of FIG. 1. The prediction model database 1030 may be implemented in a server or a storage medium.

The prediction result database 1040 is configured such that the prediction result analyzed by the time-series data processing device 1200 is collectively managed. The prediction result database 1040 may include the prediction result database 104 of FIG. 1. The prediction result database 1040 may be implemented in a server or a storage medium.

The network 1300 may be configured to perform data communication between the terminal 1100, the medical database 1010, and the time-series data processing device 1200. The terminal 1100, the medical database 1010, and the time-series data processing device 1200 may exchange data wired or wirelessly through the network 1300.

Figure 12:
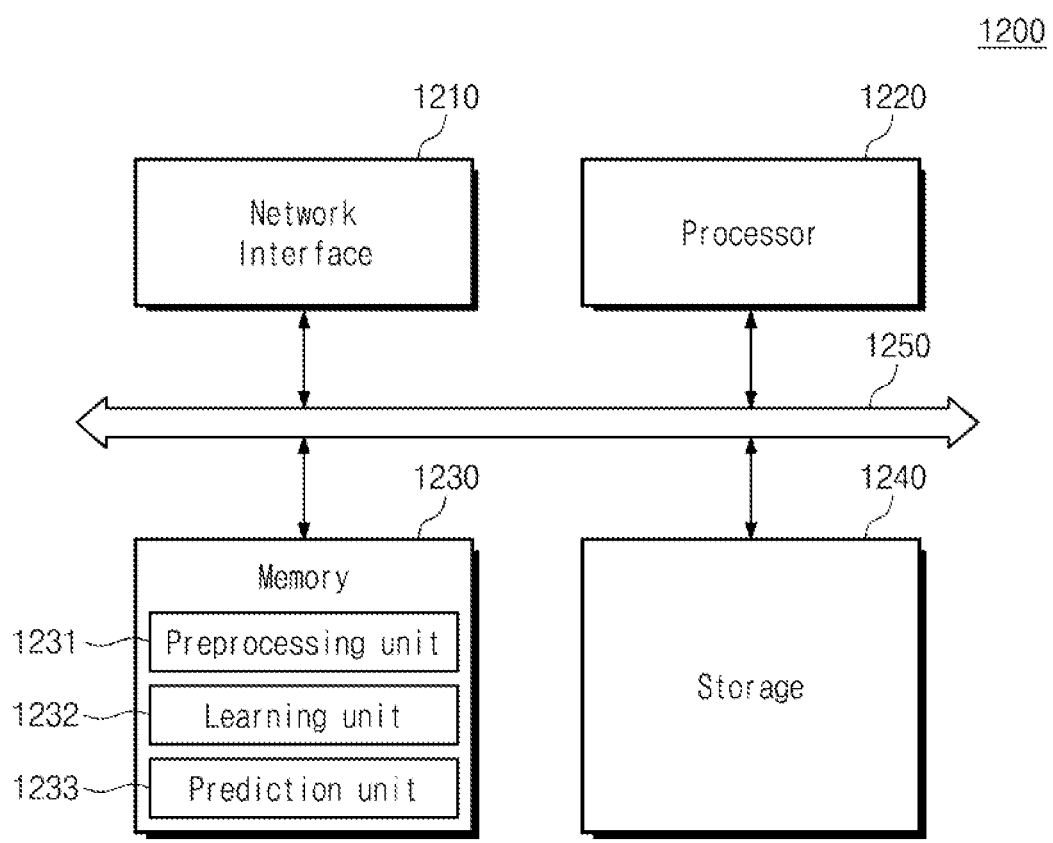
FIG. 12 is a block diagram of the time-series data processing device of FIG. 1 or 11.

FIG. 12 is a block diagram of the time-series data processing device of FIG. 1 or 11. It will be understood that the block diagram of FIG. 12 is a configuration that preprocesses time-series data, generates a weight group based on the preprocessed time-series data, and generates a prediction result based on the weight group. The structure of a time-series data processing device may not be limited thereto. Referring to FIG. 12, the time-series data processing device 1200 may include a network interface 1210, a processor 1220, a memory 1230, storage 1240, and a bus 1250. For example, the time-series data processing device 1200 may be implemented with a server, but is not limited thereto.

The network interface 1210 is configured to receive the time-series data provided from the terminal 1100 or the medical database 1010 through the network 1300 of FIG. 11. The network interface 1210 may provide the received time-series data to the processor 1220, the memory 1230, or the storage 1240 through the bus 1250. Besides, the network interface 1210 may be configured to provide a prediction result of a future health condition generated in response to the received time-series data to the terminal 1100 or the like through the network 1300 of FIG. 11.

The processor 1220 may function as the central processing device of the time-series data processing device 1200. The processor 1220 may perform a control operation and a calculation operation that are required to implement preprocessing and data analysis of the time-series data processing device 1200. For example, the network interface 1210 may receive the time-series data from the outside under control of the processor 1220. Under the control of the processor 1220, the calculation operation for generating a weight group of a prediction model may be performed, and the prediction result may be calculated by using the prediction model. The processor 1220 may operate by utilizing a computational space of the memory 1230 and may read files for driving an operating system and execution files of an application from the storage 1240. The processor 1220 may execute an operating system and various applications.

The memory 1230 may store data and process codes, which are processed or scheduled to be processed by the processor 1220. For example, the memory 1230 may include the time-series data, information for performing a preprocessing operation of the time-series data, information for generating a weight group, information for calculating a prediction result, and information for building a prediction model. The memory 1230 may be used as a main memory device of the time-series data processing device 1200. The memory 1230 may include a dynamic random access memory (DRAM), a static RAM (SRAM), a phase-change RAM (PRAM), a magnetic RAM (MRAM), a ferroelectric RAM (FeRAM), a resistive RAM (RRAM), or the like.

A preprocessing unit 1231, a learning unit 1232, and a prediction unit 1233 may be loaded and executed onto the memory 1230. The preprocessing unit 1231, the learning unit 1232, and the prediction unit 1233 correspond to the preprocessor 110, the learner 120, and the predictor 130 of FIG. 1, respectively. The preprocessing unit 1231, the learning unit 1232, and the prediction unit 1233 may be the part of the computational space of the memory 1230. In this case, the preprocessing unit 1231, the learning unit 1232, and the prediction unit 1233 may be implemented with firmware or software. For example, the firmware may be stored in the storage 1240 and then may be loaded onto the memory 1230 when the firmware is executed. The processor 1220 may execute the firmware loaded onto the memory 1230. The preprocessing unit 1231 may be operated to preprocess the time-series data under the control of the processor 1220. The learning unit 1232 may be operated to generate a weight group by analyzing the preprocessed time-series data under the control of the processor 1220. The prediction unit 1233 may be operated to generate a prediction result based on the weight group generated under the control of the processor 1220.

The storage 1240 may store data generated for long-term storage by an operating system or applications, a file for driving an operating system, execution files of applications, or the like. For example, the storage 1240 may store files for executing the preprocessing unit 1231, the learning unit 1232, and the prediction unit 1233. The storage 1240 may be used as an auxiliary storage device of the time-series data processing device 1200. The storage 1240 may include a flash memory, a PRAM, an MRAM, a FRAM, an RRAM, etc.

The bus 1250 may provide a communication path between the components of the time-series data processing device 1200. The network interface 1210, the processor 1220, the memory 1230, and the storage 1240 may exchange data with each other through the bus 1250. The bus 1250 may be configured to support various types of communication formats used in the time-series data processing device 1200.

According to an embodiment of the present disclosure, a time-series data processing device may improve the accuracy and reliability of a prediction result by preprocessing the time-series data in consideration of an irregular time interval of the time-series data and the irregular time interval of each of the features according to a missing value, and an operating method thereof.

Furthermore, according to an embodiment of the present disclosure, a time-series data processing device may improve the accuracy and reliability of a prediction result by building a prediction model to comprehensively consider the weights of a time and a feature of time-series data, and an operating method thereof.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A time-series data processing device comprising:
a preprocessor configured to generate time-series interval data based on a time interval of time-series data, to generate feature interval data based on a time interval of each of features of the time-series data, and to preprocess the time-series data; and
a learner configured to generate a weight group of a prediction model for generating a prediction result based on the time-series interval data, the feature interval data, and the preprocessed time-series data,
wherein the preprocessor is further configured to:
preprocess the time-series data by putting an interpolation value into a missing value of the time-series data, and
generate masking data for identifying the missing value,
wherein the learner is further configured to generate the weight group further based on the masking data,
wherein the time-series data includes the features corresponding to each of a plurality of times, and
wherein the preprocessor is configured to:
generate the time-series interval data corresponding to a first time based on a difference between the first time and a second time preceding the first time among the plurality of times, and
generate the feature interval data corresponding to a first target feature of the first time based on a time interval between the first target feature corresponding to the first time and a second target feature corresponding to the second time preceding the first time.

2. The time-series data processing device of claim 1, wherein, when the second target feature corresponding to the second time is a missing value and a third target feature corresponding to a third time preceding the second time is present, the preprocessor is configured to generate the feature interval data corresponding to the first target feature of the first time based on a difference between the first time and the third time.

3. The time-series data processing device of claim 2, wherein the preprocessor is configured to generate the feature interval data corresponding to the second target feature of the second time based on a difference between the second time and the third time.

4. The time-series data processing device of claim 2, wherein each of the time-series interval data and the feature interval data corresponding to an initial time among a plurality of times of the time-series data has an initial value.

5. A time-series data processing device comprising:
a preprocessor configured to generate time-series interval data based on a time interval of time-series data, to generate feature interval data based on a time interval of each of features of the time-series data, and to preprocess the time-series data; and
a learner configured to generate a weight group of a prediction model for generating a prediction result based on the time-series interval data, the feature interval data, and the preprocessed time-series data,
wherein the preprocessor is further configured to:
preprocess the time-series data by putting an interpolation value into a missing value of the time-series data, and
generate masking data for identifying the missing value,
wherein the learner is further configured to generate the weight group further based on the masking data, and
wherein the learner includes:
a feature learner configured to:
calculate a feature weight of each of the features based on a first parameter group of the weight group, the feature interval data, and the preprocessed time-series data, and
generate a first learning result of the preprocessed time-series data based on the calculated feature weight;
a time-series learner configured to:
calculate a time-series weight of each of times of the time-series data based on a second parameter group of the weight group, the time-series interval data, and the first learning result, and
generate a second learning result of the preprocessed time-series data based on the time-series weight; and
a weight controller configured to adjust the first parameter group or the second parameter group based on the first learning result or the second learning result.

6. The time-series data processing device of claim 5, wherein the feature learner includes:
a feature irregularity processor configured to generate encoding data corresponding to each of the features by encoding the preprocessed time-series data and the feature interval data;
a feature weight calculator configured to calculate the feature weight by assigning the first parameter group to the encoding data;
a feature weight applicator configured to generate a feature application result by applying the encoding data or an intermediate result of the feature weight calculator to the calculated feature weight; and
a missing value processor configured to generate the first learning result by processing the feature application result based on a missing value of the time-series data.

7. The time-series data processing device of claim 5, wherein the feature learner is configured to:
generate merged data corresponding to each of the features by classifying the preprocessed time-series data and the feature interval data based on the features,
generate encoding data by encoding the merged data, and
calculate the feature weight by assigning the first parameter group to the encoding data.

8. The time-series data processing device of claim 5, wherein the feature learner is configured to:
generate merged data by merging the preprocessed time-series data and the feature interval data,
generate encoding data corresponding to each of the features by encoding the merged data, and
calculate the feature weight by assigning the first parameter group to the encoding data.

9. The time-series data processing device of claim 5, wherein the time-series learner includes:
a time-series irregularity processor configured to encode the time-series interval data;
a time-series weight calculator configured to calculate the time-series weight by assigning the second parameter group to the encoded time-series interval data and the first learning result; and
a time-series weight applicator configured to generate the second learning result by applying the first learning result or an intermediate result of the time-series weight calculator to the calculated time-series weight.

10. A time-series data processing device comprising:
a preprocessor configured to generate time-series interval data based on a time interval of time-series data, to generate feature interval data based on a time interval of each of features of the time-series data, and to preprocess the time-series data; and
a predictor configured to generate a time-series weight, which depends on a feature weight of each of the features and a time flow of the time-series data, based on the time-series interval data, the feature interval data, and the preprocessed time-series data and to generate a prediction result based on the feature weight and the time-series weight,
wherein the predictor includes:

a feature predictor configured to generate a first result of the preprocessed time-series data based on the feature weight;
a time-series predictor configured to generate a second result of the preprocessed time-series data based on the time-series weight; and
a result generator configured to calculate the prediction result corresponding to a target time based on the second result.

11. The time-series data processing device of claim 10, wherein the preprocessor is further configured to:
preprocess the time-series data by putting an interpolation value into a missing value of the time-series data, and
generate masking data for identifying the missing value, and
wherein the feature predictor includes:
a feature irregularity processor configured to generate encoding data by encoding the feature interval data and the preprocessed time-series data;
a feature weight calculator configured to generate the feature weight by applying a prediction model to the encoding data;
a feature weight applicator configured to generate a feature application result by applying the encoding data or an intermediate result of the prediction model to the feature weight; and
a missing value processor configured to generate the first result by applying the masking data to the feature application result.

12. The time-series data processing device of claim 10, wherein the time-series predictor includes:
a time-series irregularity processor configured to encode the time-series interval data;
a time-series weight calculator configured to generate the time-series weight by applying a prediction model to the encoded time-series interval data and the first result; and
a time-series weight applicator configured to generate the second result by applying the first result or an intermediate result of the prediction model to the time-series weight.

13. The time-series data processing device of claim 10, wherein, when a value for a first target feature is present at a first time among a plurality of times of the time-series data and a second target feature is a missing value at a second time preceding the first time, the time-series interval data corresponding to the first time is different from the feature interval data corresponding to the first target feature of the first time.

14. A time-series data processing device, comprising:
a preprocessor configured to generate time-series interval data based on a time interval of time-series data, to generate feature interval data based on a time interval of each of features of the time-series data, and to preprocess the time-series data; and
a predictor configured to generate a time-series weight, which depends on a feature weight of each of the features and a time flow of the time-series data, based on the time-series interval data, the feature interval data, and the preprocessed time-series data and to generate a prediction result based on the feature weight and the time-series weight,
wherein the predictor includes:
a feature analyzer configured to generate the feature weight based on the feature interval data and the preprocessed time-series data;

a time-series analyzer configured to generate the time-series weight based on the time-series interval data and the preprocessed time-series data; and
an integrated weight applicator configured to generate the prediction result by applying the preprocessed time-series data to the feature weight and the time-series weight, and
wherein, when a value for a first target feature is present at a first time among a plurality of times of the time-series data and a second target feature is a missing value at a second time preceding the first time, the time-series interval data corresponding to the first time is different from the feature interval data corresponding to the first target feature of the first time.

15. A method of calculating, based on time-series data including a missing value, a prediction result corresponding to a target time, the method comprising:
generating interpolation data by putting an interpolation value into the missing value of the time-series data;
generating time-series interval data based on a time interval of the time-series data including generating the time-series interval data corresponding to a first time based on a difference between the first time and a second time preceding the first time among a plurality of times;
generating feature interval data based on a time interval of each of features of the time-series data including generating the feature interval data corresponding to a first target feature of the first time based on a time interval between the first target feature corresponding to the first time and a second target feature corresponding to the second time preceding the first time;
generating masking data based on the missing value;
generating a feature weight of each of the features based on the interpolation data and the feature interval data;
generating a first result based on the feature weight and the masking data;
generating a time-series weight, which depends on a time flow of the time-series data, based on the first result and the time-series interval data;
generating a second result based on the time-series weight, and
calculating the prediction result corresponding to the target time based on the second result.

16. The method of claim 15, further comprising:
adjusting a weight group for generating the feature weight or the time-series weight based on the second result.

* * * * *